(12) United States Patent
Romaniuk et al.

(10) Patent No.: US 12,271,857 B2
(45) Date of Patent: Apr. 8, 2025

(54) DATA PROCESSING SYSTEM AND METHOD FOR DETERMINING INSTRUCTIONS FOR DATA OBJECT PREPARATION

(71) Applicant: 7-Eleven, Inc., Irving, TX (US)

(72) Inventors: Michael John Christopher Romaniuk, Southlake, TX (US); Sumesh Singh Pawar, Irving, TX (US); Lwin Moe Aung, Carrollton, TX (US); Dayna Leanne Hardgrove, Knoxville, TN (US); Yukiko Yamada Jones, Sachse, TX (US); Abhilash Kannan, Frisco, TX (US); Murali Chemboon Ramachari, Plano, TX (US); Vikram Simha Reddy Ganta, Irving, TX (US); Yaqub Ahmad Baiani, Richardson, TX (US); Shadi Fallah, Dallas, TX (US); Sudha Venugopalan, Irving, TX (US)

(73) Assignee: 7-ELEVEN, INC., Irving, TX (US)

( * ) Notice: Subject to any disclaimer, the term of this patent is extended or adjusted under 35 U.S.C. 154(b) by 428 days.

(21) Appl. No.: 17/449,066

(22) Filed: Sep. 27, 2021

(65) Prior Publication Data
US 2023/0101782 A1    Mar. 30, 2023

(51) Int. Cl.
*G06Q 10/0833*     (2023.01)
*G06Q 10/0832*     (2023.01)
*G06Q 30/0601*     (2023.01)
*G06Q 50/40*       (2024.01)
*H04L 12/18*       (2006.01)

(52) U.S. Cl.
CPC ...... *G06Q 10/0833* (2013.01); *G06Q 10/0832* (2013.01); *G06Q 30/0633* (2013.01); *G06Q 50/40* (2024.01); *H04L 12/1868* (2013.01)

(58) Field of Classification Search
None
See application file for complete search history.

(56) References Cited

U.S. PATENT DOCUMENTS 9,412,280 B1    8/2016  Zwillinger et al.
10,783,462 B1 * 9/2020  Mo .................... G06Q 10/047
(Continued)

OTHER PUBLICATIONS

Fan, Junchuan, et al. "Using big GPS trajectory data analytics for vehicle miles traveled estimation." Transportation research part C: emerging technologies 103 (2019): 298-307 (Year: 2019).*
(Continued)

*Primary Examiner* — George Chen
(74) *Attorney, Agent, or Firm* — Baker Botts L.L.P.

(57) ABSTRACT

A system generates a set of instructions for preparing content of a memory resource that comprises a set of objects in a particular sequence. The system sends the content of the memory resource and the set of instructions to a user device. The system receives a first message that indicates the set of objects is being prepared from the user device. The system sends, to a server associated with a delivery vehicle, a third message to alert the delivery vehicle to pick up the set of objects from a pickup location and deliver to a delivery location coordinate. The system receives, from the server, an alert message that indicates the delivery vehicle has reached the pickup location coordinate. The system forwards the alert message to the user device.

20 Claims, 16 Drawing Sheets

(56) References Cited

U.S. PATENT DOCUMENTS

| | | | |
|---|---|---|---|
| 11,222,299 B1* | 1/2022 | Baalke | G01C 21/3688 |
| 2013/0346521 A1* | 12/2013 | Arabo | H04L 67/61 |
| | | | 709/206 |
| 2014/0143061 A1* | 5/2014 | Abhyanker | G06Q 50/01 |
| | | | 705/14.58 |
| 2015/0186869 A1* | 7/2015 | Winters | G06Q 10/08 |
| | | | 705/26.81 |
| 2019/0197544 A1* | 6/2019 | Frost | G07F 9/023 |
| 2020/0065734 A1* | 2/2020 | Szybalski | G06Q 30/0635 |
| 2022/0107650 A1* | 4/2022 | Blume | G05D 1/0221 |

OTHER PUBLICATIONS

International Search Report and Written Opinion for Application No. PCT/US2022/076992, mailed Jan. 2, 2023.

Romaniuk, M. J. C. et al., "Delivery Vehicle Selection Based on Location Data and Memory Resource Content," U.S. Appl. No. 17/448,944, filed Sep. 27, 2021, 106 pages.

Romaniuk, M. J. C. et al., "System and Method for Presenting Autonomous Delivery Mechanisms and Non-Autonomous Delivery Mechanisms," U.S. Appl. No. 17/448,977, filed Sep. 27, 2021, 106 pages.

Romaniuk, M. J. C. et al., "Autonomous Delivery Mechanism and a User Device Network Communication," U.S. Appl. No. 17/448,999, filed Sep. 27, 2021, 102 pages.

Romaniuk, M. J. C. et al., "Physical Space Assignment Based On Resource Data and Memory Resource Content," U.S. Appl. No. 17/449,024, filed Sep. 27, 2021, 104 pages.

Romaniuk, M. J. C. et al., "Autonomous Delivery Mechanism Data Integration in an Application Platform," U.S. Appl. No. 17/449,057, filed Sep. 27, 2021, 104 pages.

* cited by examiner

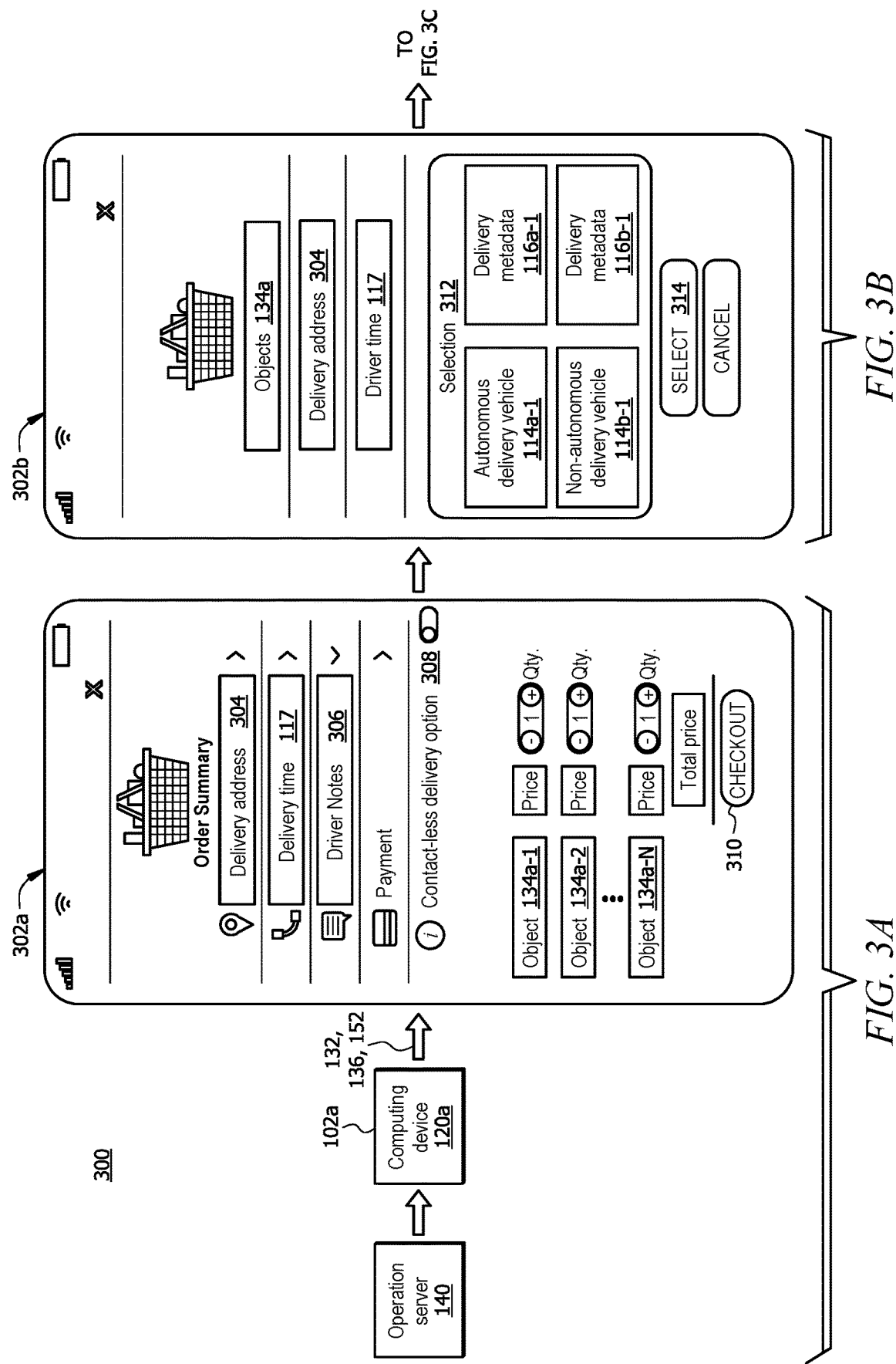

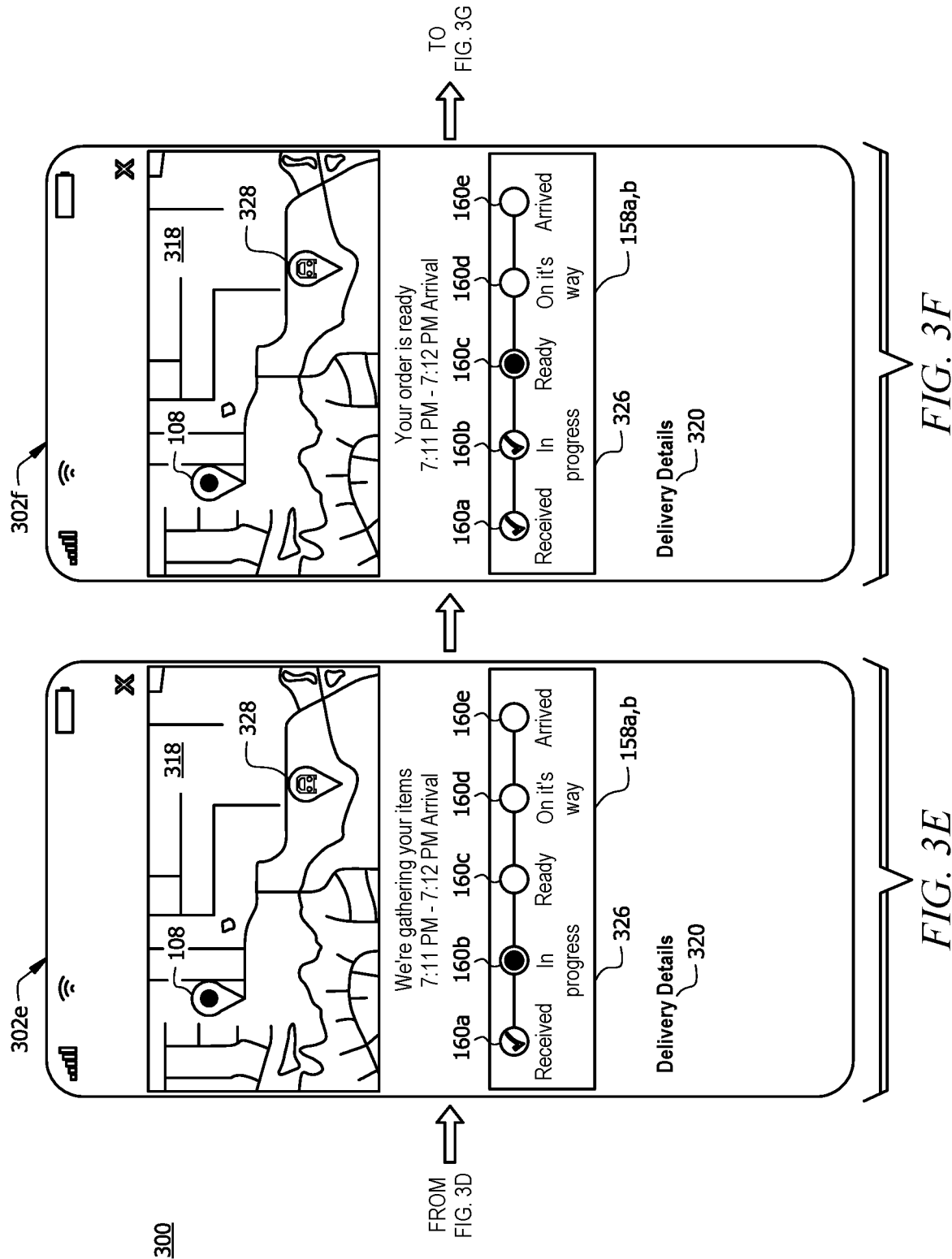

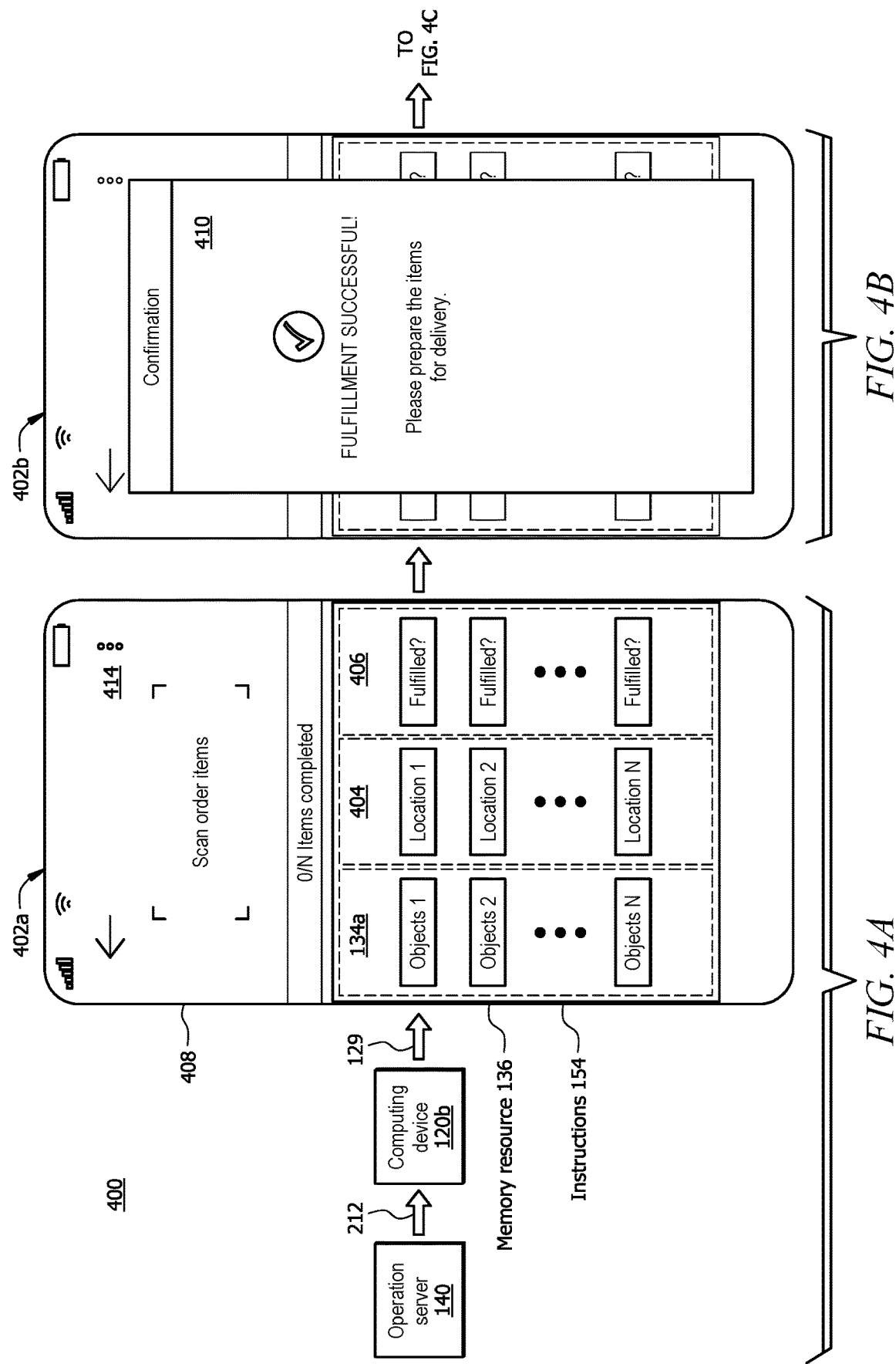

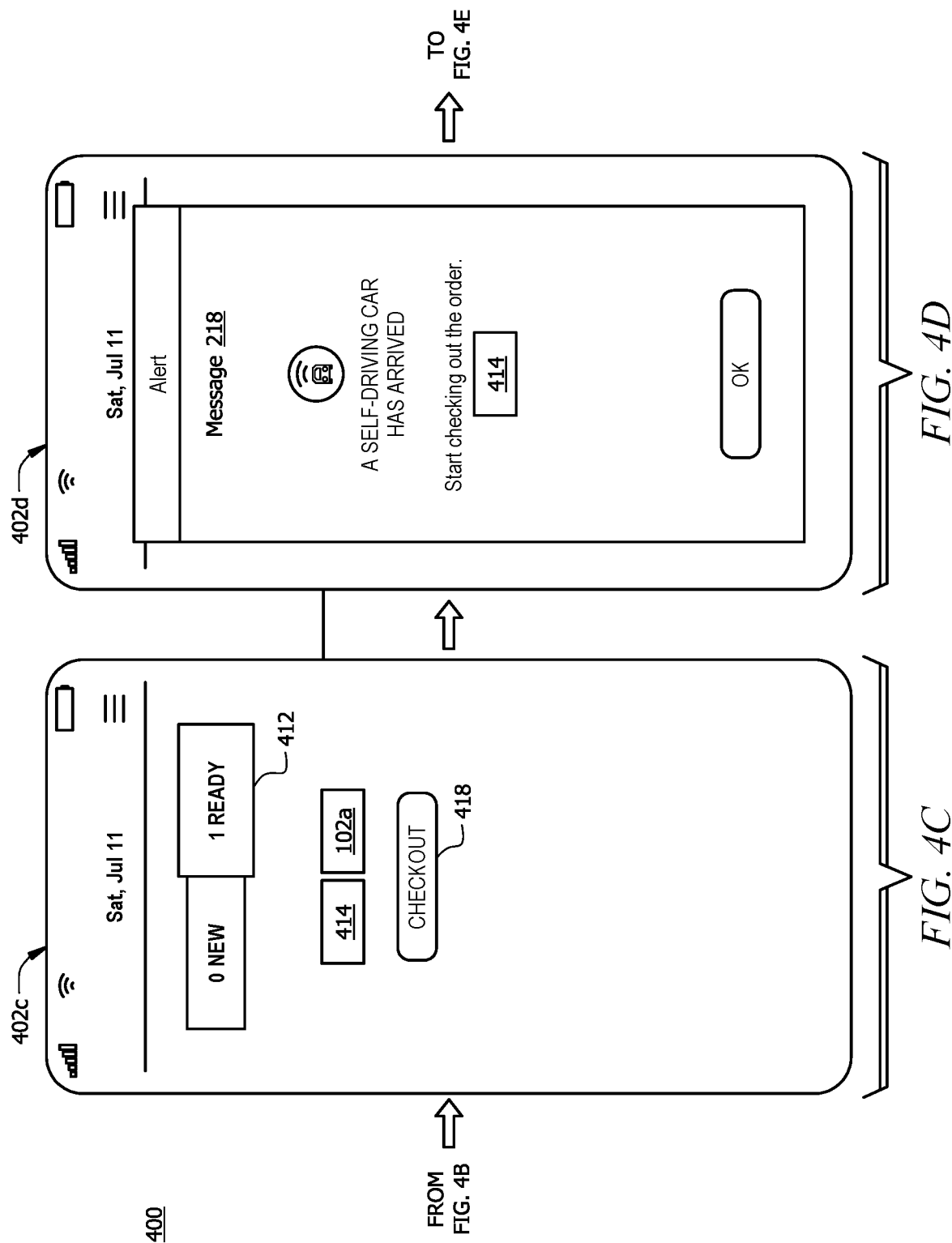

DATA PROCESSING SYSTEM AND METHOD FOR DETERMINING INSTRUCTIONS FOR DATA OBJECT PREPARATION

TECHNICAL FIELD

The present disclosure relates generally to data processing, and more specifically to a data processing system and method for determining instructions for data object preparation.

BACKGROUND

Organizations that provide products use online application platforms to provide delivery services. Some organizations have engaged in delivery made by human drivers. Other organizations have engaged in delivery made by autonomous vehicles. However, human drivers may not be the optimal option for certain types of delivery due to several reasons, such as not providing delivery services in a particular area or zip code, not providing delivery services during particular times of the day, among others. Similarly, autonomous vehicles may not be the optimal option for certain types of delivery due to several reasons such as not providing delivery services for certain age-restricted objects, among others listed above. The existing technology lacks the ability to provide a selection of autonomous and non-autonomous delivery vehicles.

SUMMARY

Particular embodiments of systems disclosed in the present disclosure are particularly integrated into a practical application of enabling the network communication between an operation server (e.g., a backend server associated with a delivery user interface) and a plurality of servers associated with autonomous delivery mechanisms and non-autonomous delivery mechanisms.

The delivery user interface (e.g., available on a software, mobile, or web application) may be used to order objects online from the Internet. The objects may be stored in a memory block, a memory resource, or a database in the cloud. In one embodiment, the memory resource comprises a digital cart or an electronic cart. In one embodiment, the objects may be represented by data objects for items loaded into the digital cart. In one embodiment, the operation server implements a recommendation system to determine a selection of a particular autonomous delivery mechanism and a particular non-autonomous delivery mechanism based on the content of the memory resource. The operation server presents the selection of the particular autonomous delivery mechanism and the particular non-autonomous delivery mechanism on the delivery user interface.

In contrast to current technologies, the disclosed system selects the particular autonomous delivery mechanism from within an autonomous delivery mechanism category that includes multiple autonomous delivery options, and the particular non-autonomous delivery mechanism from within a non-autonomous delivery mechanism category that includes multiple non-autonomous delivery options, based on their delivery metadata as described below.
Selecting an Autonomous Delivery Mechanism and a Non-Autonomous Delivery Mechanism According to an embodiment, a system for selecting delivery mechanisms comprises a memory and a processor. The memory is configured to store pick-up location coordinates and delivery location coordinates associated with an order, where the order comprises content of a memory resource. The processor is operably coupled with the memory. The processor sends a request message to a plurality of servers associated with a plurality of delivery mechanism categories to provide delivery metadata. The plurality of delivery mechanism categories comprises one or more autonomous delivery mechanisms and one or more non-autonomous delivery mechanisms. The request message comprises a request to deliver the order, the pick-up location coordinates of the order, and the delivery location coordinates of the order. The delivery metadata for each delivery mechanism within a particular delivery mechanism category comprises at least one of a delivery time for the order and a delivery quote for the order. The delivery time comprises a duration of time for a particular delivery mechanism to deliver the order to the delivery location coordinates. The delivery quote comprises a cost for the particular delivery mechanism to deliver the order to the delivery location coordinates. The processor receives, from the plurality of servers, a first set of delivery metadata associated with the one or more autonomous delivery mechanisms and a second set of delivery metadata associated with the one or more non-autonomous delivery mechanisms. The processor identifies a particular autonomous delivery mechanism from among the one or more autonomous delivery mechanisms based at least in part upon the first set of delivery metadata. For example, the processor may select the particular autonomous delivery mechanism because the particular autonomous delivery mechanism is associated with the smallest delivery quote from within the autonomous delivery mechanism category. The processor identifies a particular non-autonomous delivery mechanism from among the one or more non-autonomous delivery mechanisms based at least in part upon the second set of delivery metadata. For example, the processor may select the particular non-autonomous delivery mechanism because the particular non-autonomous delivery mechanism is associated with the smallest delivery quote from within the non-autonomous delivery mechanism category. The processor communicates to a user device the identified particular autonomous delivery mechanism. The processor communicates to the user device the identified particular non-autonomous delivery mechanism.

In this manner, the disclosed system determines a selection of the identified particular autonomous delivery mechanism and the identified particular non-autonomous delivery mechanism.

As such, the disclosed system provides several practical applications and technical advantages, which include: 1) technology that enables the network communication between the operation server and the plurality of servers associated with autonomous and non-autonomous delivery mechanism categories; 2) technology that provides access to both autonomous and non-autonomous delivery mechanism categories in a single application platform; 3) technology that selects a more optimal autonomous delivery mechanism option from among a set of autonomous delivery mechanisms based on delivery metadata received from servers associated with the set of autonomous delivery mechanisms; and 4) technology that selects a more optimal non-autonomous delivery mechanism from among a set of non-autonomous delivery mechanisms based on delivery metadata received from servers associated with the set of non-autonomous delivery mechanisms.

As such, the disclosed system may be integrated into a practical application of improving the network communication among computing devices, including the operation server (associated with the delivery user interface) and the plurality of servers associated with the autonomous and non-autonomous delivery mechanism categories.

This, in turn, provides an additional practical application of improving the underlying operations of the operation server. For example, by providing a selection of autonomous and non-autonomous delivery mechanisms to a user during an interaction session, the interaction session can be concluded in less time. Thus, less network communication bandwidth is needed between the operation server and a computing device from which the delivery user interface is accessed.

Presenting Status Updates Associated with an Autonomous Delivery Mechanism

This disclosure further contemplates a system and a method for presenting status updates associated with an autonomous delivery mechanism on a delivery user interface. Upon determining that the content of the memory resource is finalized, the disclosed system may perform one or more operations to present one or more status updates associated with the autonomous delivery mechanism on the delivery user interface, as described below.

For example, the disclosed system may present status updates when the status of the autonomous delivery mechanism changes, where the status updates may be associated with the location coordinate of the autonomous delivery mechanism. In some examples, the disclosed system may present: 1) a first status update that indicates the autonomous delivery mechanism is scheduled or booked to make a first stop at a pickup location (to pick up the ordered objects) and make a second stop at a delivery location (to deliver the ordered objects); 2) a second status update that indicates the autonomous delivery mechanism has arrived at the pickup location; 3) a third status update that indicates the autonomous delivery mechanism is waiting at the pickup location; 4) a fourth status update that indicates the autonomous delivery mechanism is loaded with the ordered objects; 5) a fifth status update that indicates the autonomous delivery mechanism is on the way toward the delivery location; 6) a sixth status update that indicates the autonomous delivery mechanism is has reached the delivery location; 7) a seventh status update that indicates the autonomous delivery mechanism is waiting at the delivery location; and 8) an eighth status update that indicates the ordered objects are retrieved from the autonomous delivery mechanism.

According to another embodiment, a system comprises a memory and a processor. The memory is configured to store a plurality of objects associated with a memory resource. The processor is operably coupled with the memory. The processor presents, on a delivery user interface, a plurality of objects. The processor updates the content of the memory resource as one or more objects are stored in the memory resource. The processor determines whether the content of the memory is finalized. In response to determining that the content of the memory is finalized, the processor may perform one or more operations below. The processor receives, from an operation server, a particular autonomous delivery mechanism and a particular non-autonomous delivery mechanism, where the particular autonomous delivery mechanism and the particular non-autonomous delivery mechanism are selected based at least in part upon filtering conditions associated with the content of the memory. The processor presents the particular autonomous delivery mechanism and the particular non-autonomous delivery mechanism on the delivery user interface. The processor determines that a delivery mechanism is selected from among the particular autonomous delivery mechanism and the particular non-autonomous delivery mechanism. For example, assume that the particular autonomous delivery mechanism is selected. The processor receives, from the operation server, one or more status updates associated with the delivery mechanism, where the one or more status updates represent event changes associated with the delivery mechanism from when the delivery mechanism is selected until the delivery mechanism delivers the plurality of objects to a delivery location. The processor displays the one or more status updates on the delivery user interface.

As such, the disclosed system provides several practical applications and technical advantages, which include: 1) technology that receives one or more status updates associated with the autonomous delivery mechanism from a server associated with the autonomous delivery mechanism; and 2) technology that presents the one or more status updates in a delivery user interface. Thus, a user does not have to leave the delivery user interface to view the one or more status updates associated with the autonomous delivery mechanism. This leads to improving the user experience of the delivery user interface.

As such, the disclosed system may be integrated into a practical application of improving the current user interface technology by integrating the one or more status updates into the delivery user interface.

Presenting a Set of Instructions on a User Device for Preparing a Set of Objects This disclosure further contemplates a system and a method for enabling network communication between the operation server, a server associated with an autonomous delivery mechanism, and a user device used to receive a set of instructions to prepare a set of objects associated with a memory resource. Thus, the disclosed system may be configured to present, on the user device, the set of instructions for preparing the set of objects, for example, by a store associate. The set of instructions may indicate preparing the set of objects in a particular sequence.

For example, assume that the set of objects include an above temperature object, an ambient temperature object, and a below temperature object. In this example, the set of instructions may indicate to prepare the set of objects such that the above-ambient temperature object is prepared first, the ambient temperature is prepared second, and the below-ambient temperature is prepared third.

In another example, the set of instruction may include scheduling instructions that indicate to prepare the set of objects, such that a first timestamp that indicates the above-ambient temperature object is ready to be prepared is synchronized with a second timestamp that indicates when the autonomous delivery vehicle will reach the pickup location coordinate.

In this manner, the set of objects is ready for pickup when the autonomous delivery mechanism will reach the pickup location coordinate. Thus, the autonomous delivery mechanism does not wait at the pickup location coordinate to be loaded with the set of objects. Thus, the disclosed system may be integrated into a practical application of saving fuel and other resources that the autonomous delivery mechanism would otherwise use if the delivery mechanism would have to wait at the pickup location coordinate.

According to another embodiment, a system comprises a memory and a processor. The memory is configured to store a plurality of objects associated with a memory resource (e.g., a digital cart). The processor is operably coupled with the memory. The processor presents, on a user interface, a first message that indicates an operation associated with the plurality of objects is concluded. In one embodiment, the operation may be a transaction, such as a purchase transaction of items loaded into a digital cart. The processor presents, on the user interface, the plurality of objects. The processor presents, on the user interface, a set of instructions to prepare the plurality of objects for pickup, where the set of instructions indicates to fetch the plurality of objects from within a physical space. In one embodiment, the physical space may comprise a physical store, a retail store, and/or the like. The processor receives a second message that indicates that the plurality of objects is ready for pickup by a delivery vehicle. The processor presents, on the user interface, an alert message that indicates the delivery vehicle has reached a pickup location coordinate. If a category of the delivery vehicle is an autonomous vehicle delivery vehicle, the processor presents, on the user interface, a pin number that unlocks the autonomous vehicle delivery vehicle.

As such, the disclosed system provides several practical applications and technical advantages, which include: 1) technology that enables the network communication between the operation server, the server associated with the autonomous delivery mechanism, and the user device (where the set of instructions for preparing the set of objects is presented); 2) technology that provides the set of instructions for preparing the set of objects, such that the set of objects is ready for pickup when the autonomous delivery mechanism will reach the pickup location; 3) technology that improves the efficiency in the process of preparing the set of objects using the set of instructions; and 4) technology that saves fuel and other resources that the autonomous delivery would have to use if the autonomous would have to wait at the pickup or delivery location coordinates.

Assigning Physical Space(s) to a Memory Resource Based on Object(s) Stored in the Memory Resource and Resource Data Associated with the Physical Space(s)

This disclosure further contemplates a system and a method for assigning one or more physical spaces to a memory resource based on a set of objects stored in the memory resource and resource data associated with the one or more physical spaces. The disclosed system determines which one or more physical spaces can fulfill more than a threshold percentage of objects from among the set of objects (e.g., 70%, 80%, etc.), and assigns the one or more determined physical spaces to the memory resource. The disclosed system determines the one or more physical spaces that can fulfill more than the threshold percentage of objects based on comparing the content of the memory resource with one or more resource data associated with the one or more physical spaces, where resource data associated with a physical space includes objects that are available at the physical space.

In other words, the disclosed system determines which one or more resource data associated with one or more physical spaces include more than the threshold percentage of objects stored in the memory resource, and assigns one or more physical spaces associated with the one or more identified resource data.

The disclosed system may inform the selected delivery mechanism that it needs to make one or more stops at one or more pickup location coordinates associated with the one or more determined physical spaces.

According to another embodiment, a system comprises a memory and a processor. The memory is operable to store a first resource data associated with a first physical space and a second resource data associated with a second physical space. The processor is operably coupled with the memory. The processor receives, from a user device, content of a memory resource. The content of the memory resource comprises a set of objects. The processor compares the content of the memory resource with the first resource data and the second resource data. The processor determine which of the first resource data and the second resource data includes more than a first threshold percentage of objects in the memory resource based at least in part upon the comparison between the content of the memory resource with the first resource data and the second resource data. The processor determines which of the first resource data and the second resource data includes more than a first threshold percentage of objects in the memory resource based at least in part upon the comparison between the content of the memory resource with the first resource data and the second resource data. The processor determines that the first resource data includes more than the first threshold percentage of objects in the memory resource. The processor determines that the first resource data includes more than the first threshold percentage of objects in the memory resource. In response to determining that the first resource data includes more than the first threshold percentage of objects in the memory resource, the processor associates the first physical space to the memory resource for concluding an operation associated with the set of objects.

As such, the disclosed system provides several practical applications and technical advantages, which include: 1) technology that enables assigning one or more resource data associated with one or more physical spaces to a memory resource; thus, the content of the memory resource can be fulfilled even if there is no single memory resource that includes the set of objects stored in the memory resource; 2) technology that informs a server associated with the selected delivery mechanism to make one or more stops at one or more pickup location coordinates associated with one or more physical spaces associated with the one or more identified resource data; and 3) technology that enables network communication between the operation server, the server associated with the selected delivery mechanism, and a user device from which the set of objects is received.

Integrating an Adjust Drop-Off Location Element into a Delivery User Interface

This disclosure further contemplates a system and a method for integrating an adjust drop-off location element into a delivery user interface. The drop-off location is the delivery location coordinate that a user indicates during an interaction session with the delivery user interface.

The current technology is not configured to integrate the adjust drop-off location element into the delivery user interface. In the current technology, if a user wants to adjust the drop-off location, they would have to exit the delivery user interface to access a hyperlink that accesses a webpage where the drop-off location is shown on a virtual map. This prior approach reduces the efficiency in processing and memory utilization because the user device would have to allocate extra processing and memory resources to open the webpage where the drop-off location is shown on the virtual map. Furthermore, this leads to a poor user experience with the delivery user interface. Accordingly, the approach described in the present application improves efficiency in the use of computer resources as well as the user experience.

According to an embodiment, a system comprises a memory and a processor. The memory is configured to store a drop-off location coordinate. The processor is operably coupled with the memory. The processor sends, to a server associated with a delivery mechanism, the drop-off location coordinate. The processor receives from the server a hyperlink that upon access, the drop-off location is displayed on a virtual map, where the drop-off location can be adjusted on the virtual map. The processor links the hyperlink to an adjust drop-off element, such that when the adjust drop-off element is accessed, the virtual map is displayed within a delivery user interface. The processor integrates the adjust drop-off element into the delivery user interface such that the adjust drop-off element is accessible from within the delivery user interface.

As such, the disclosed system provides several practical applications and technical advantages, which include: 1) technology that enables adjusting the drop-off location from within the delivery user interface; and 2) technology that enables network communication between the operation server, a server associated with a delivery mechanism, and a user device from which the delivery user interface is accessed. This leads to improving the user experience of the delivery user interface.

As such, the disclosed system may be integrated into a practical application of improving the current user interface technology by integrating the adjust drop-off location element into the delivery user interface.

Generating a Set of Instructions for Preparing a Set of Objects Associated with a Memory Resource This disclosure further contemplates a system and a method for generating a set of instructions for preparing a set of objects associated with a memory resource. The disclosed system may generate the set of instructions to prepare the set of objects in a particular sequence. For example, if it is determined that the set of objects includes an above-ambient temperature object, the disclosed system generates a first instruction that indicates to prepare the above-ambient temperature object before the other objects. In another example, if it is determined that the set of objects includes an ambient temperature object, the disclosed system generates a second instruction that indicates to prepare the ambient temperature object after the above-ambient temperature objects. In another example, if it is determined that the set of objects includes a below-ambient temperature object, the disclosed system generates a third instruction that indicates to prepare the below-ambient temperature object after the ambient temperature objects.

According to an embodiment, a system comprises a memory and a processor. The memory is configured to store a set of objects. The processor is operably coupled with the memory. The processor generates a set of instructions to prepare the set of objects in a particular sequence. The processor sends, to a user device, a first message that comprises at least one of the set of objects and the set of instructions. The processor receives, from the user device, a second message that indicates the set of objects is being prepared. The processor sends, to a server associated with a delivery vehicle, a third message to alert the delivery vehicle to pick up the set of objects from a pickup location coordinate and deliver to a delivery location coordinate. The processor receives, from the server, an alert message that indicates the delivery vehicle has reached the pickup location coordinate. The processor forwards the alert message to the user device, such that the alert message is presented on a user interface.

As such, the disclosed system provides several practical applications and technical advantages, which include: 1) technology that generates the set of instructions for preparing the set of objects in a particular sequence; 2) technology that enables the network communication between the operation server, the server associated with the autonomous delivery mechanism, and the user device (where the set of instructions for preparing the set of objects is presented); and 3) technology that improves the efficiency in the process of preparing the set of objects using the set of instructions.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 3A-3I illustrate an exemplary user-side experience operational flow describing user interaction with a delivery user interface;

FIGS. 4A-4G illustrate an exemplary user-side experience operational flow 400 describing associate interaction with a user interface;

DETAILED DESCRIPTION

As described above, previous technologies fail to provide efficient and reliable solutions to enable network communication between an operation server and a plurality of servers associated with autonomous and non-autonomous delivery mechanisms, and thus fail to provide access to both autonomous and non-autonomous delivery mechanisms on a single application platform. This disclosure provides various systems, methods, and devices to enable network communication between an operation server and a plurality of servers associated with autonomous and non-autonomous delivery mechanisms, and to provide access to both autonomous and non-autonomous delivery mechanisms on a single application platform.

Figure 1A:
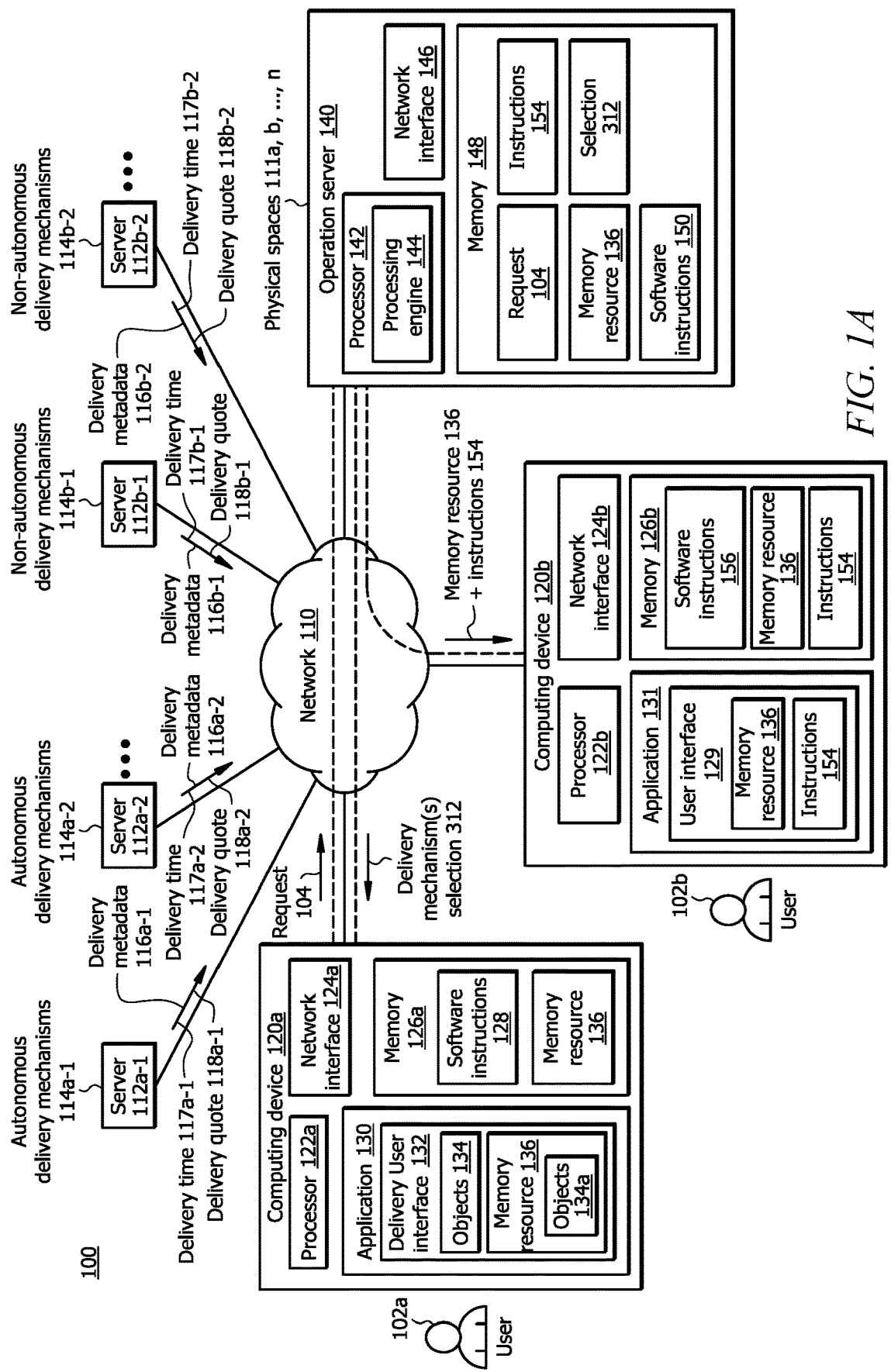
FIGS. 1A and 1B illustrate an embodiment of a system configured enable network communication between an operation server and a plurality of servers associated with autonomous and non-autonomous delivery mechanisms.
Figure 1B:
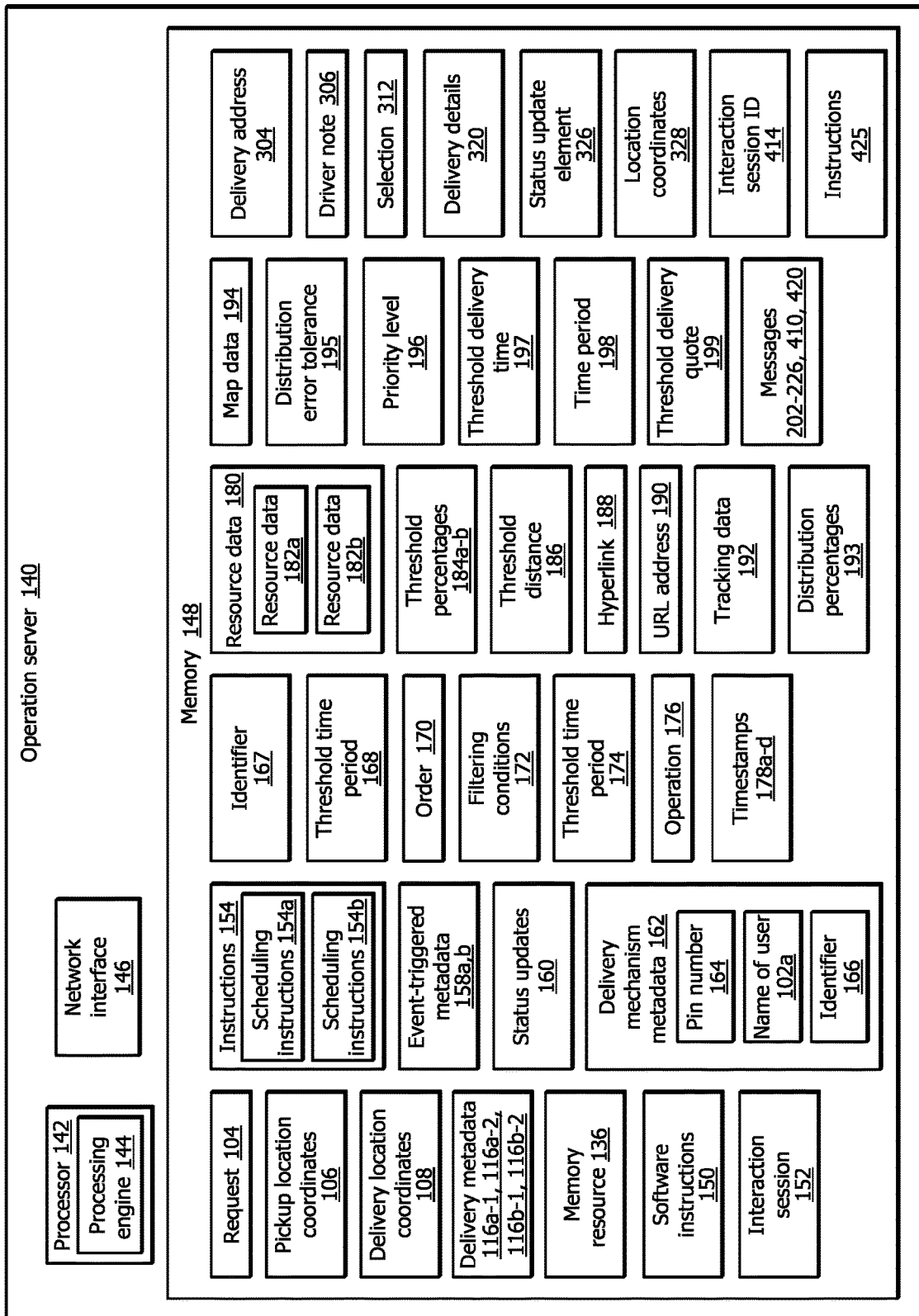
Figure 2:
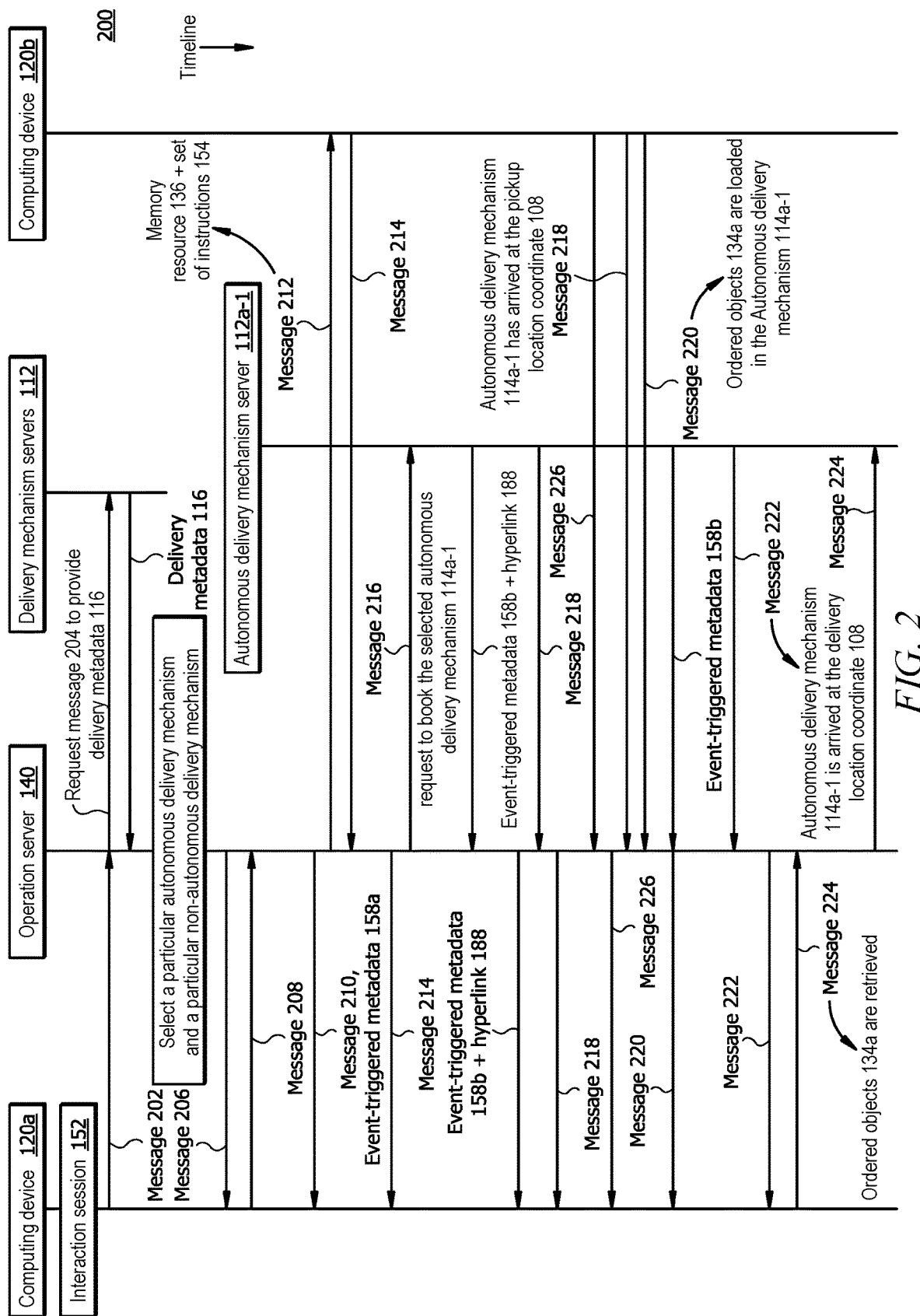
FIG. 2 illustrates an operational flow of the system of FIGS. 1A and 1B for enabling network communication between the operation server and the plurality of servers associated with autonomous and non-autonomous delivery mechanisms.
Figure 5:
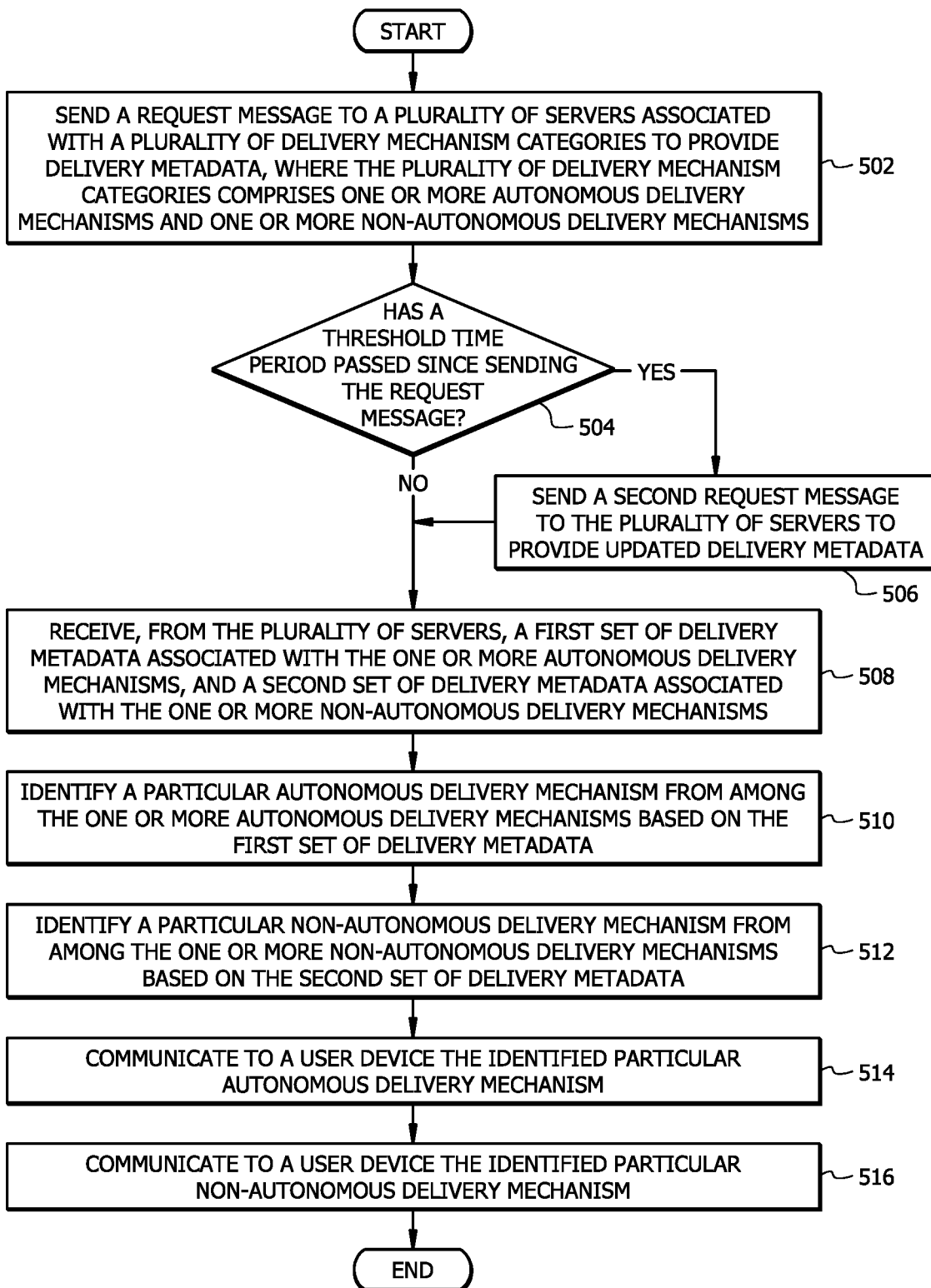
FIG. 5 illustrates a method for selecting delivery mechanisms.
Figure 6:
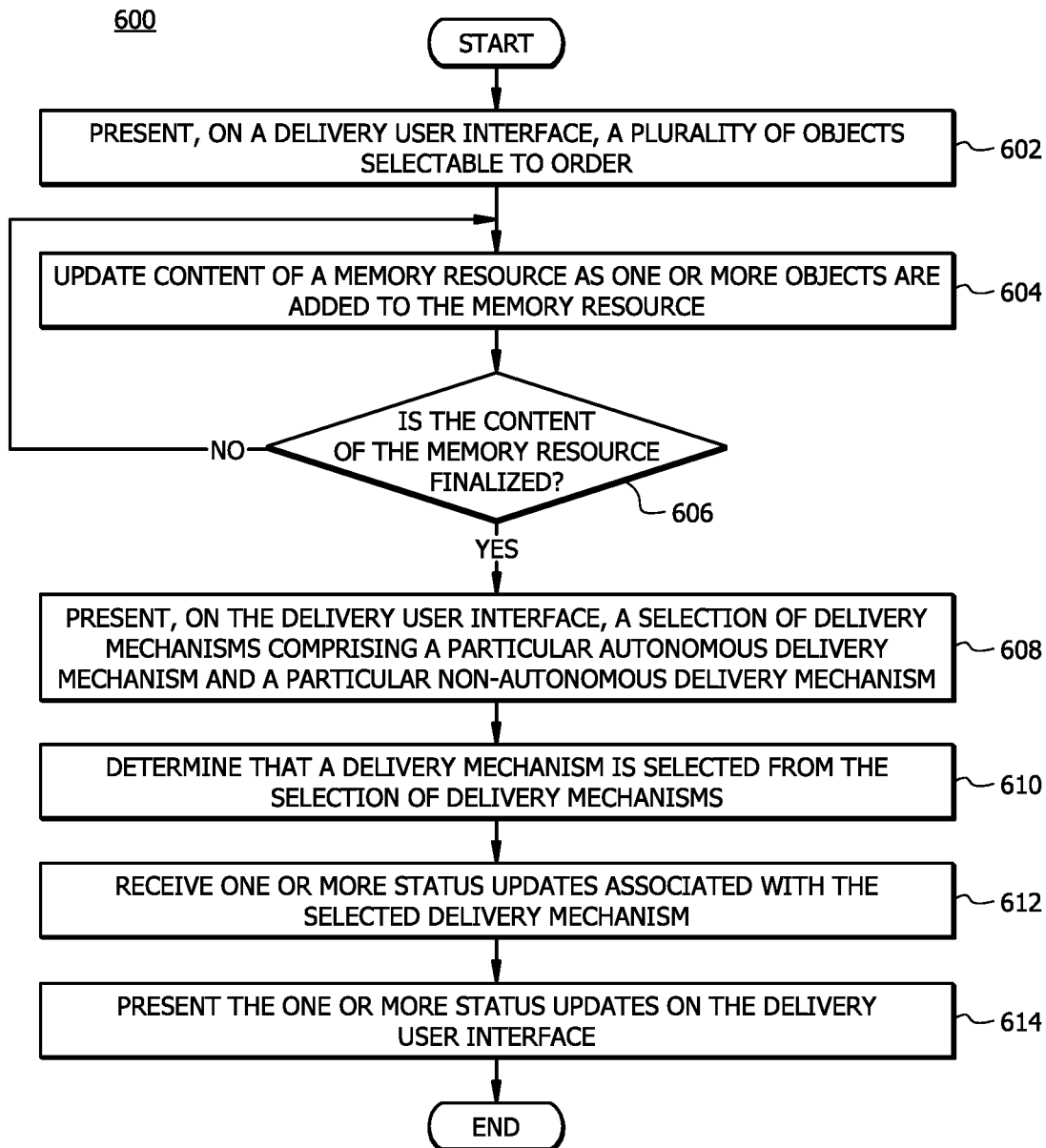
FIG. 6 illustrates a method for presenting status updates associated with the selected delivery mechanism.
Figure 7:
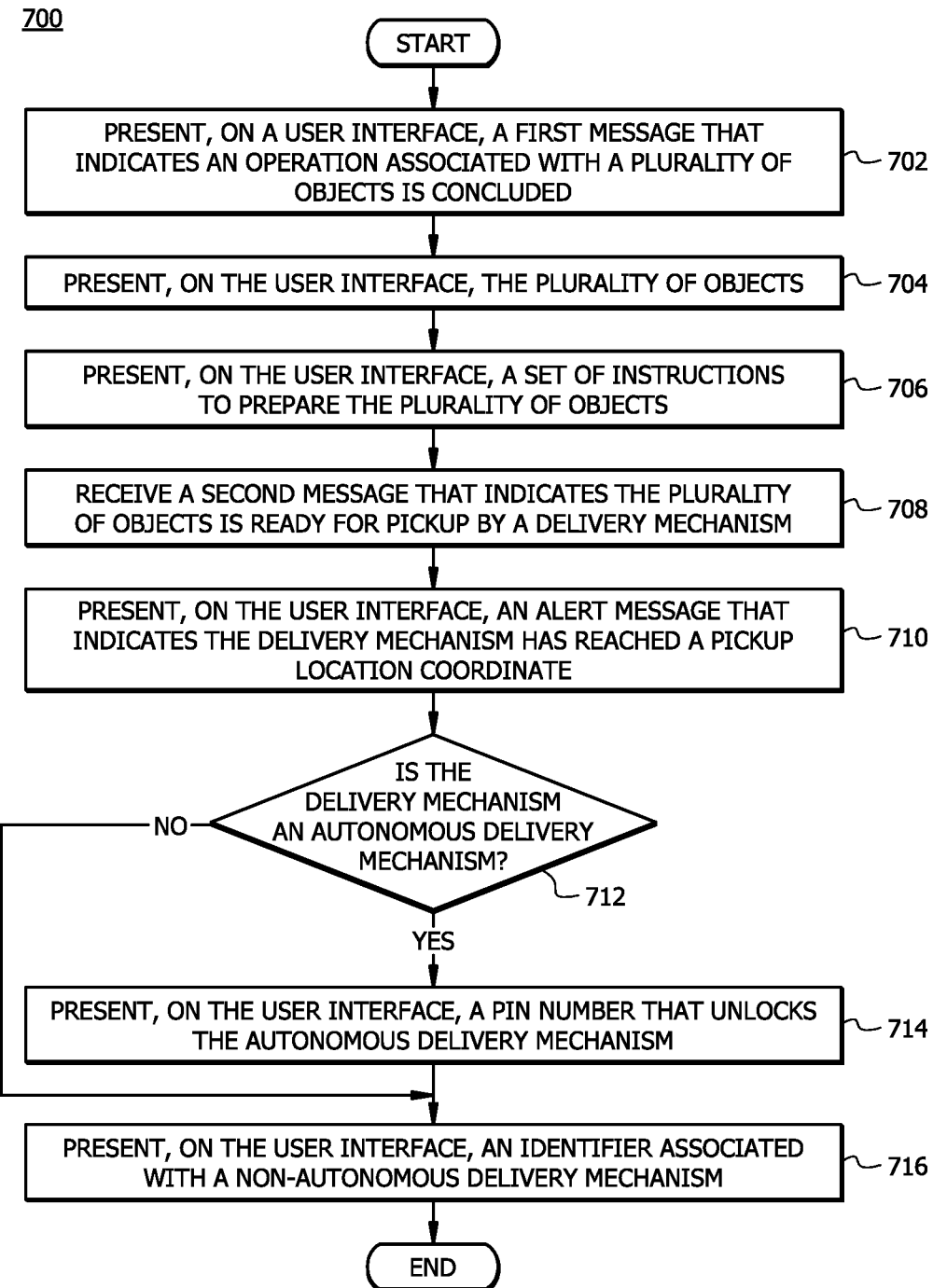
FIG. 7 illustrates a method for presenting the set of instructions for preparing a set of objects associated with a memory resource.
Figure 8:
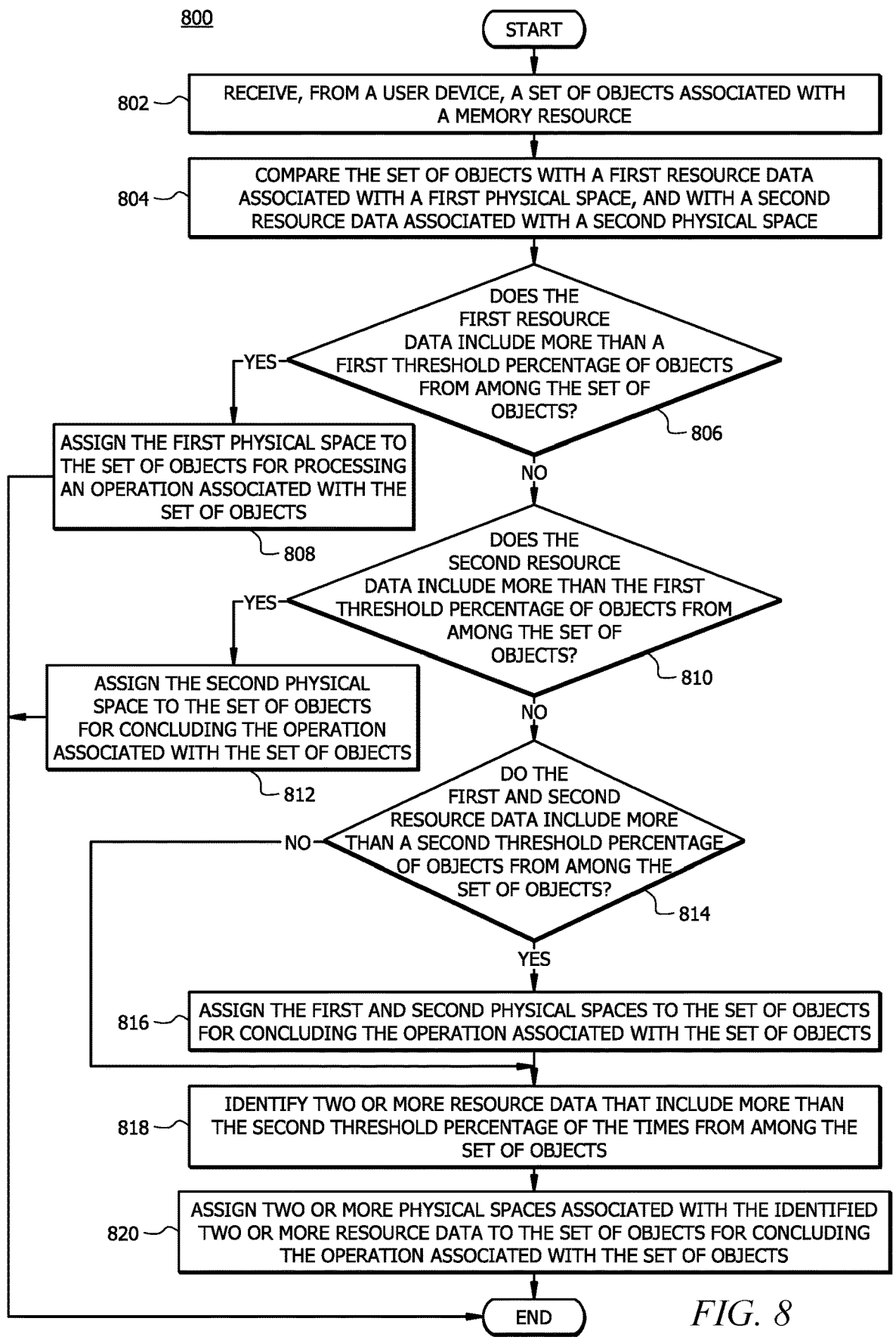
FIG. 8 illustrates a method for assigning a physical space to a memory resource.
Figure 9:
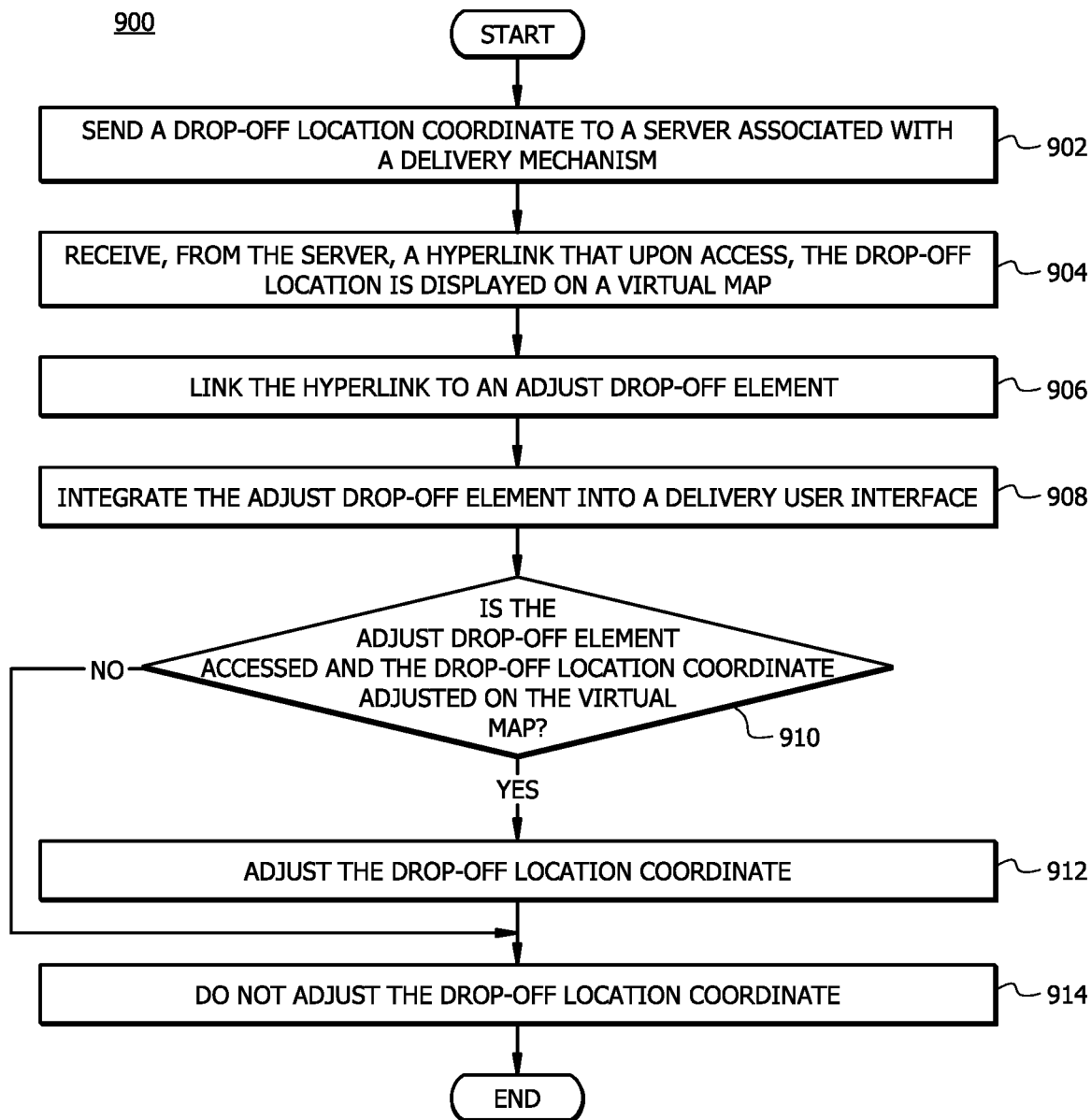
FIG. 9 illustrates a method for integrating an adjust drop-off location into a delivery user interface.
Figure 10:
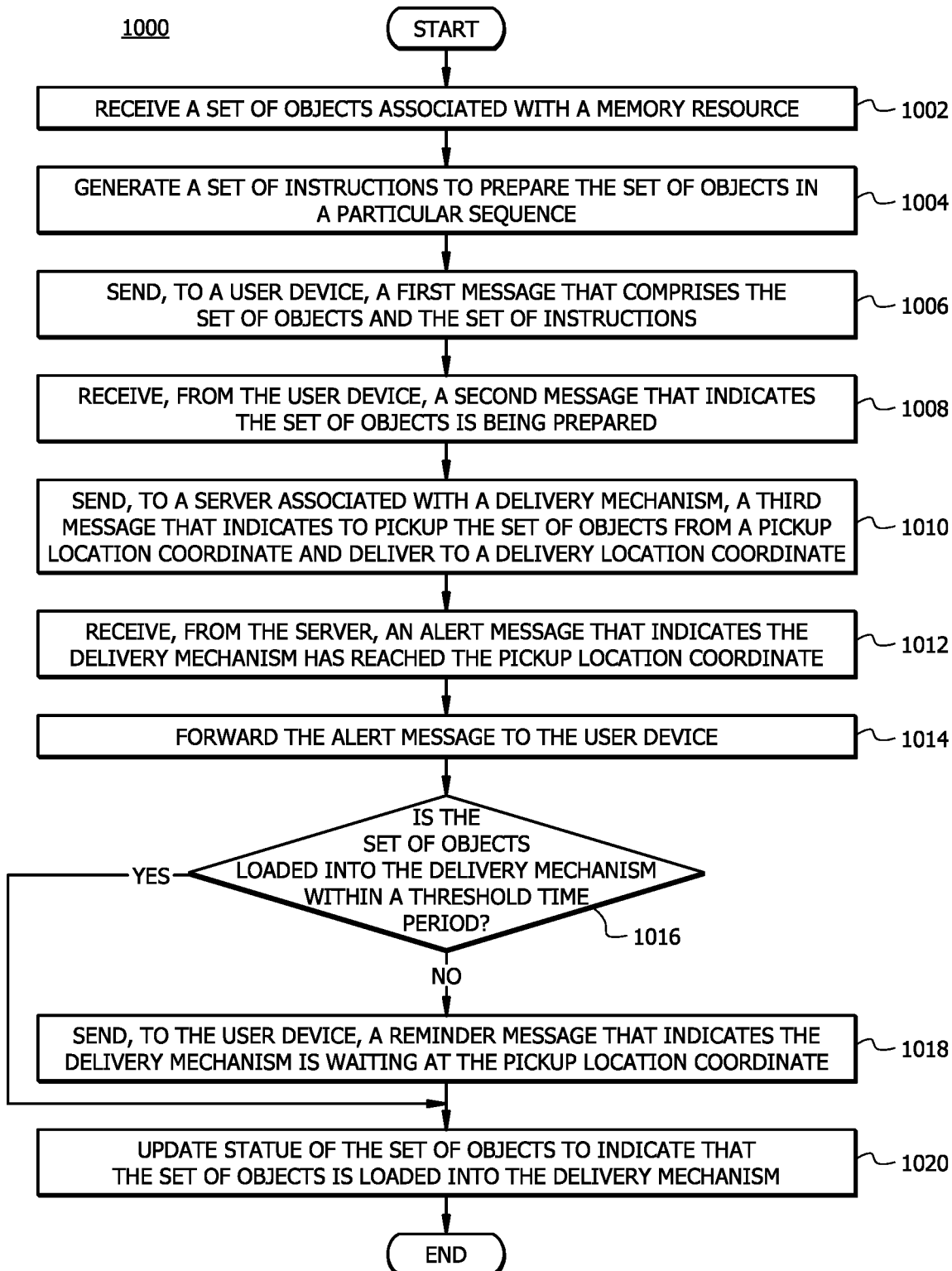
FIG. 10 illustrates a method for generating a set of instructions to prepare a set of objects in a particular sequence.

FIGS. 1A and 1B illustrate one embodiment of a system 100 for enabling network communication between the operation server and the plurality of servers associated with autonomous and non-autonomous delivery mechanisms. FIG. 2 illustrates one embodiment of an operational flow 200 of the system 100 for enabling network communication between the operation server and the plurality of servers associated with autonomous and non-autonomous delivery mechanisms and providing access to both autonomous and non-autonomous delivery mechanisms on a single application platform. FIGS. 3A-3I illustrate one embodiment of a user-side experience operational flow 300 describing user interaction with a delivery user interface, presenting the selection of a particular autonomous and a particular non-autonomous delivery mechanisms, and finalizing content of a memory resource. FIGS. 4A-4G illustrate one embodiment of a user-side experience operational flow 400 describing associate interaction with a user interface and presenting a set of instructions for preparing a set of objects associated with a memory resource in a particular sequence. FIG. 5 illustrates one embodiment of a method 500 for selecting a particular autonomous mechanism from among one or more autonomous delivery mechanisms, and a particular non-autonomous delivery mechanism from among one or more non-autonomous delivery mechanisms. FIG. 6 illustrates one embodiment of a method 600 for presenting status updates associated with the selected delivery mechanism. FIG. 7 illustrates one embodiment of a method 700 for presenting a set of instructions for preparing a set of objects associated with a memory resource. FIG. 8 illustrates one embodiment of a method 800 for assigning a physical space to a memory resource. FIG. 9 illustrates one embodiment of a method 900 for integrating an adjust drop-off location element into a delivery user interface. FIG. 10 illustrates one embodiment of a method 1000 for generating a set of instructions to prepare a set of objects associated with a memory resource in a particular sequence.

Example System

FIGS. 1A and 1B illustrate one embodiment of a system 100 that is generally configured to facilitate network communication among two or more computing devices (e.g., computing devices 120a, b, servers 112a-1, 112a-2, 112b-1, and 112b-2, and operation server 140) to select a particular autonomous delivery mechanism 114a from within a category of autonomous delivery mechanisms 114a, and select a particular non-autonomous delivery mechanism 114b from within a category of non-autonomous delivery mechanisms 114b. In one embodiment, system 100 comprises an operation server 140. In some embodiments, system 100 further comprises a network 110, one or more computing devices 120, and one or more servers 112. Network 110 enables communications among the components of the system 100. The operation server 140 comprises a processor 142 in signal communication with a memory 148. Memory 148 stores software instructions 150 that when executed by the processor 142 cause the processor 142 to perform one or more functions described herein. FIG. 1B illustrates other data stored in the memory 148. In other embodiments, system 100 may not have all of the components listed and/or may have other elements instead of, or in addition to, those listed above.

An exemplary operational flow 200 of the system 100 is described in FIG. 2. The corresponding description below describes a brief exemplary operation of the system 100.

In an exemplary operation, assume that a user 102a wants to order one or more objects 134 online from the Internet. The user 102a may access a delivery user interface 132 on the computing device 120a. The computing device 120a may be configured to present one or more objects 134 on the delivery user interface 132. The computing device 120a may initiate an interaction session 152 during which the user 102a selects one or more objects 134 on the delivery user interface 132. The operation of conducting the interaction session 152 is described in detail further below in conjunction with the operational flow 200 of the system 100 described in FIG. 2. Exemplary screenshots 302a-302i of the delivery user interface 132 with respect to a user-side experience conducting the interaction session 152 are illustrated in FIGS. 3A-3I.

Upon determining that the one or more objects 134a are added to the memory resource 136 on the delivery user interface 132, the operation server 140 requests one or more servers 112a associated with autonomous delivery mechanisms 114a and one or more servers 112b associated with non-autonomous delivery mechanisms 114b to provide delivery metadata 116. Each server 112 may send a different delivery metadata 116. In one embodiment, the memory resource 136 comprises a digital cart or an electronic cart. In one embodiment, the one or more objects 134a may be represented by data objects for items loaded into the digital cart.

Each delivery metadata 116 may include a delivery time 117 and a delivery quote 118. The delivery time 117 may comprise a duration of time for a delivery mechanism 114 to deliver the ordered objects 134a (e.g., the order 170) to the delivery location coordinate 108. The delivery quote 118 may comprise a cost for a delivery mechanism 114 to deliver the ordered objects 134a to the delivery location coordinate 108.

The operation server 140 receives a first set of delivery metadata 116a (e.g., including delivery metadata 116a-1 and 116a-2) from the one or more servers 112a (e.g., servers 112a-1 and 112a-2) associated with autonomous delivery mechanisms 114a. Based on the first set of delivery metadata 116a, the operation server 140 identifies a particular autonomous delivery mechanism 114a (e.g., autonomous delivery mechanism 114a-1).

Similarly, the operation server 140 receives a second set of delivery metadata 116b (e.g., including delivery metadata 116b-1 and 116b-2) from the one or more servers 112b (e.g., servers 112b-1 and 112b-2) associated with non-autonomous delivery mechanisms 114b. Based on the second set of delivery metadata 116b, the operation server 140 identifies a particular non-autonomous delivery mechanism 114b (e.g., non-autonomous delivery mechanism 114b-1).

The operation server 140 communicates the identified particular autonomous delivery mechanism 114a and the identified particular non-autonomous delivery mechanism 114b to the computing device 120a. In other words, the operation server 140 (e.g., via the processing engine 144) displays a selection 312 of the identified particular autonomous delivery mechanism 114a and the identified particular non-autonomous delivery mechanism 114b on the computing device 120a (see the selection 312 in FIG. 3B). In this manner, a user 102a can select a delivery mechanism 114 from the selection to deliver the ordered objects 134a. This operation is described in more detail in conjunction with the operational flow 200 of the system 100 described in FIG. 2.

If only one delivery metadata 116a is received from the category of the autonomous delivery mechanisms 114a, the operation server 140 may present the autonomous delivery mechanism 114a associated with the received delivery metadata 116a.

The corresponding description below describes an example scenario where the autonomous delivery mechanism category 114a comprises the first autonomous delivery mechanism 114a-1, and the non-autonomous delivery mechanism 114b comprises the first non-autonomous delivery mechanism 114b-1 and the second non-autonomous delivery mechanism 114b-2.

The operation server 140 receives the delivery metadata 116a-1 from the server 112a-1 associated with the first autonomous delivery mechanism 114a-1, the delivery metadata 116*b*-1 from the server 112*b*-1 associated with the first non-autonomous delivery mechanism 114*b*-1, and the delivery metadata 116*b*-2 from the server 112*b*-2 associated with the second non-autonomous delivery mechanism 114*b*-2.

The operation server 140 may determine which delivery quote 118*b* is the smallest delivery quote 118*b* within the non-autonomous delivery mechanism category 114*b*. For example, the operation server 140 may determine that the delivery quote 118*b*-1 is the smallest delivery quote 118*b* between the received delivery quotes 118*b* within the non-autonomous delivery mechanism category 114*b*. Thus, the operation server 140 selects the first non-autonomous delivery mechanism 114*b*-1 from among the non-autonomous delivery mechanism category 114*b*. In response, the operation server 140 may communicate the first non-autonomous delivery mechanism 114*b*-1 to the computing device 120*a* to be included in the selection 312 (see FIGS. 1 and 3B).

Since, in this example scenario, it is assumed that only the autonomous delivery mechanism 114*a*-1 is included in the autonomous delivery mechanism 114*a*, the operation server 140 may communicate the autonomous delivery mechanism 114*a*-1 to the computing device 120*a* to be included in the selection 312 (see FIGS. 1A-1B and 3B).

In another example scenario where the autonomous delivery mechanism category 114*a* further comprises the second autonomous delivery mechanism 114*a*-2, the operation server 140 may select a particular autonomous delivery mechanism 114*a* within the autonomous delivery mechanism 114*a*, similar to that described in method 500 and FIG. 2.

Upon determining that a delivery mechanism 114 is selected on the delivery user interface 132, e.g., by the user 102*a*, the operation server 140 sends a message to the computing device 120*b* that may comprise the content of memory resource 136 and a set of instructions 154 to prepare the objects 134*a* in a particular sequence. The computing device 120*b* may be configured to display the content of the memory resource 136 and the set of instructions 154 on a user interface 129. In one embodiment, the computing device 120*b* may be associated with a user 102*b*. The operation server 140 may send another message to the computing device 120*b* when the delivery mechanism 114 arrives at a pickup location 106. In one example, the pickup location coordinate 106 may be a location coordinate of a physical space 111. This operation is described in more detail in conjunction with the operational flow 200 of the system 100 described in FIG. 2. Exemplary screenshots 402*a*-402*g* of the user interface 129 with respect to presenting the set of instructions 154 on the user interface 129 are illustrated in FIGS. 4A-4G.

System Components

Network

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Delivery Mechanism Server

Each of the servers 112*a*-1, 112*a*-2, 112*b*-1, and 112*b*-2 is an instance of a server 112. The server 112 is generally a device that is configured to process data and communicate with computing devices (e.g., the operation server 140), databases, etc., via the network 110. Each server 112 may comprise a processor in signal communication with a memory to perform one or more functions of the server 112 described herein. For example, a software application designed using software code may be stored in the memory of the server 112 (not shown) and executed by the processor of the server 112 (not shown) to perform the functions of the server 112.

Each server 112 may be associated with one or more delivery mechanisms 114. In the illustrated embodiment, system 100 may include a plurality of servers 112 associated with a plurality of delivery mechanism categories 114. The plurality of delivery mechanism categories 114 may include an autonomous delivery mechanism category 114*a* and a non-autonomous delivery mechanism category 114*b*.

The system 100 may include a set of servers 112*a* that is associated with autonomous delivery mechanisms 114*a*. For example, the server 112*a*-1 may be associated with one or more autonomous delivery mechanisms 114*a*-1, and the server 112*a*-2 may be associated with one or more autonomous delivery mechanisms 114*a*-2. In some examples, the autonomous delivery mechanisms 114*a* may include one or more autonomous vehicles, one or more autonomous drones, one or more sidewalk autonomous mechanisms, among others. Similarly, the system 100 may include a set of servers 112*b* that is associated with non-autonomous delivery mechanisms 114*b*. For example, the server 112*b*-1 may be associated with one or more non-autonomous delivery mechanisms 114*b*-1, and the server 112*b*-2 may be associated with one or more non-autonomous delivery mechanisms 114*b*-2. In some examples, the non-autonomous delivery mechanisms 114*b* may include human-driven vehicles.

Computing Device

Each of the computing devices 120*a* and 120*b* is an instance of a computing device 120. In one embodiment, the computing device 120*a* may be associated with the user 102*a* (e.g., a customer). In one embodiment, the computing device 120*b* may be associated with the user 102*b* (e.g., a store associate). Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor 122, memory 126, and/or circuitry configured to perform any of the functions or actions of the computing device 120 described herein. For example, a software application designed using software code may be stored in the memory 126 and executed by the processor 122 to perform the functions of the computing device 120.

In one embodiment, the computing device 120*a* may be used to order one or more objects 134, e.g., online from the Internet. For example, the computing device 120*a* may be configured to 1) present one or more objects 134 on the delivery user interface 132; 2) determine that one or more objects 134 are added to the memory resource 136; 3) present a selection of an autonomous delivery mechanism 114*a* and a non-autonomous delivery mechanism 114*b* on the delivery user interface 132; 4) present status updates 160 associated with a selected delivery mechanism 114, e.g., from a time when the content of the memory resource 136 is finalized until a time when the delivery mechanism 114 arrives at a delivery location 108. In other embodiments, the computing device 120a may be configured to perform one or more of these functions, and/or additional functions described herein.

The computing device 120a includes a processor 122a in signal communication with a network interface 124a, a memory 126a, and an application 130. The computer device 120a may be configured as shown or in any other configuration. Memory 126a stores software instructions 128 that when executed by the processor 122a, cause the processor 122a to perform one or more functions described herein. For example, when the software instructions 128 are executed, the processor 122a executes the application 130, and oversees operations associated with the application 130. Upon execution of the application 130, the delivery user interface 132 may be displayed on a display screen of the computing device 120a.

Processor 122a comprises one or more processors operably coupled to the memory 126a. The processor 122a is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 122a may be a programmable logic device, a microcontroller, a microprocessor, or any suitable combination of the preceding. The one or more processors are configured to process data and may be implemented in hardware or software. For example, the processor 122a may be 8-bit, 16-bit, 32-bit, 64-bit, or of any other suitable architecture. The processor 122a may include an arithmetic logic unit (ALU) for performing arithmetic and logic operations. The processor 122a may register the supply operands to the ALU and store the results of ALU operations. The processor 122a may further include a control unit that fetches instructions from memory and executes them by directing the coordinated operations of the ALU, registers and other components. The one or more processors are configured to implement various software instructions. For example, the one or more processors are configured to execute software instructions 128 to perform one or more functions described herein. In this way, processor 122a may be a special-purpose computer designed to implement the functions disclosed herein. In an embodiment, the processor 122a is implemented using logic units, FPGAs, ASICs, DSPs, or any other suitable hardware. The processor 122a is configured to operate as described in FIGS. 1-10.

Network interface 124a is configured to enable wired and/or wireless communications (e.g., via network 110). The network interface 124a is configured to communicate data between the computing device 120a and other devices (e.g., operation server 140), databases, systems, or domains. For example, the network interface 124a may comprise a WIFI interface, a local area network (LAN) interface, a wide area network (WAN) interface, a modem, a switch, or a router. The processor 122a is configured to send and receive data using the network interface 124a. The network interface 124a may be configured to use any suitable type of communication protocol as would be appreciated by one of ordinary skill in the art.

Memory 126a may be volatile or non-volatile and may comprise a read-only memory (ROM), random-access memory (RAM), ternary content-addressable memory (TCAM), dynamic random-access memory (DRAM), and static random-access memory (SRAM). Memory 126a may be implemented using one or more disks, tape drives, solid-state drives, and/or the like. Memory 126a is operable to store the software instructions 128, the content of memory block/resource 136, and/or any other data or instructions. The software instructions may comprise any suitable set of instructions, logic, rules, or code operable to execute the processor 122a.

The application 130 may be a software, a mobile, and/or a web application 130. The user 102a is able to interact with the application 130 to order one or more objects 134 presented on the delivery user interface 132. The application 130 may be configured to display the delivery user interface 132 on a display screen of the computing device 120a. The user 102a can select one or more objects 134 presented on the delivery user interface 132, similar to that described above.

In one embodiment, the computing device 120b may be configured to 1) receive a message that indicates a new set of objects 134a is received (e.g., from the computing device 120a) and an operation 176 associated with the set of objects 134a is concluded; 2) present instructions 154 to prepare the objects 134a in a particular sequence; and 3) present an alert message 420 (see FIG. 4E) that indicates a delivery mechanism 114 has arrived at a pickup location coordinate 106. In one embodiment, the operation 176 may be a transaction, such as a purchase transaction of items loaded into a digital cart. The computing device 120b may be configured to perform one or more of these functions, and/or additional functions described herein.

The computing device 120b is generally any device that is configured to process data and interact with users 102. Aspects of the computing device 120b are described above, and additional aspects are described below.

The computing device 120b may be associated with a physical space 111 (e.g., a physical store), and used by the user 102b to receive the ordered objects 134a and a set of instructions 154 to prepare the ordered objects 134a, among other operations described herein.

The computing device 120b includes a processor 122b in signal communication with a network interface 124b, a memory 126b, and an application 131. The computing device 120b may be configured as shown or in any other configuration. Memory 126b stores software instructions 156 that when executed by the processor 122b, cause the processor 122b to perform one or more functions described herein. For example, when the software instructions 156 are executed, the processor 122b executes an application 131 and oversees operations associated with the application 131. Upon execution of the application 131, the user interface 129 may be displayed on a display screen of the computing device 120b.

Processor 122b comprises one or more processors operably coupled to the memory 126b. The processor 122b is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 122b may be a programmable logic device, a microcontroller, a microprocessor, or any suitable combination of the preceding. The one or more processors are configured to process data and may be implemented in hardware or software. For example, the processor 122b may be 8-bit, 16-bit, 32-bit, 64-bit, or of any other suitable architecture. The processor 122b may include an arithmetic logic unit (ALU) for performing arithmetic and logic operations. The processor 122b may register the supply operands to the ALU and store the results of ALU operations. The processor 122b may further include a control unit that fetches instructions from memory and executes them by directing the coordinated operations of the ALU, registers and other components. The one or more processors are configured to implement various software instructions. For example, the one or more processors are configured to execute software instructions 156 to perform one or more functions described herein. In this way, processor 122b may be a special-purpose computer designed to implement the functions disclosed herein. In an embodiment, the processor 122b is implemented using logic units, FPGAs, ASICs, DSPs, or any other suitable hardware. The processor 122b is configured to operate as described in FIGS. 1-10.

Network interface 124b is configured to enable wired and/or wireless communications (e.g., via network 110). The network interface 124b is configured to communicate data between the computing device 120b and other devices (e.g., operation server 140), databases, systems, or domains. For example, the network interface 124b may comprise a WIFI interface, a local area network (LAN) interface, a wide area network (WAN) interface, a modem, a switch, or a router. The processor 122b is configured to send and receive data using the network interface 124b. The network interface 124b may be configured to use any suitable type of communication protocol as would be appreciated by one of ordinary skill in the art.

Memory 126b may be volatile or non-volatile and may comprise a read-only memory (ROM), random-access memory (RAM), ternary content-addressable memory (TCAM), dynamic random-access memory (DRAM), and static random-access memory (SRAM). Memory 126b may be implemented using one or more disks, tape drives, solid-state drives, and/or the like. Memory 126b is operable to store the software instructions 128, the content of memory resource 136, the instructions 154, and/or any other data or instructions. The software instructions 156 may comprise any suitable set of instructions, logic, rules, or code operable to execute the processor 122b.

The application 131 may be a software, a mobile, and/or a web application 131. The application 131 may be configured to display ordered objects 134a (i.e., the content of the memory resource 136) and the set of instructions 154 on the user interface 129. Details of generating the set of instructions 154 based on the content of the memory resource 136 are described in conjunction with the operational flow 200 of the system 100 described in FIG. 2 and the method 1000 described in FIG. 10.

Operation Server

Operation server 140 is generally a device that is configured to process data and communicate with computing devices 120, servers 112, databases, etc., via the network 110. The operation server 140 is generally configured to oversee the operations of the processing engine 144, as described further below in conjunction with the operational flow 200 of system 100 described in FIG. 2, operational flow 300 described in FIGS. 3A-3I, operational flow 400 described in FIGS. 4A-4G, and methods 500-1000 described in FIGS. 5-10, respectively.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and store the results of ALU operations. The processor 142 may further include a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the processing engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-10. For example, the processor 142 may be configured to perform one or more steps of methods 500-1000 described in FIGS. 5-10, respectively.

Network interface 146 is configured to enable wired and/or wireless communications (e.g., via network 110). The network interface 146 is configured to communicate data between the operation server 140 and other devices (e.g., computing devices 120), databases, systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. referring to FIG. 2B, memory 148 is operable to store the software instructions 150, request 104, pickup location coordinates 106, delivery location coordinates 108, interaction session 152, memory resource 136, messages 202-226, 410, 420, order 170, delivery metadata 116a-1, 116a-2, 116b-1, 116b-2, instructions 154, event-triggered metadata 158a, b, status updates 160, threshold time period 168, filtering conditions 172, threshold time period 174, operation 176, identifier 167, timestamps 178a-d, threshold percentages 184a-b, threshold distance 186, delivery mechanism metadata 162, hyperlink 188, URL address 190, resource data 180, tracking data 192, map data 194, priority data 196, threshold delivery time 197, time period 198, delivery address 304, contact-less delivery option 308, delivery details 320, selection 312, status update element 326, location coordinate 328, interaction session ID 414, threshold delivery quote 199, distribution percentages 193, driver note 306, distribution error tolerance 195, and/or any other data or instructions. The software instructions 150 may comprise any suitable set of instructions, logic, rules, or code operable to execute the processor 142.

Referring back to FIG. 1A, the operation server 140 may be associated with a plurality of physical spaces 111, including physical spaces 111a, b, and n. Thus, the operation server 140 may store data associated with the plurality of physical spaces 111, such as resource data 180. The operation server 140 may use the resource data 180 to assign one or more physical spaces 111 to a memory resource 136 (or order 170). In one embodiment, the physical space 111 may comprise a physical store, a retail store, and/or the like. This operation is described further below in conjunction with the method 800 described in FIG. 8.

Processing Engine

Processing engine 144 may be implemented by the processor 142 executing the software instructions 150, and is generally configured to perform one or more functions described herein including: 1) identify a particular autonomous delivery mechanism 114a from among a set of autonomous delivery mechanisms 114a based on delivery metadata 116a associated with the set of autonomous delivery mechanisms 114a; 2) identify a particular non-autonomous delivery mechanism 114b from among a set of non-autonomous delivery mechanisms 114b based on delivery metadata 116b associated with the set of non-autonomous delivery mechanisms 114b; and 3) present a selection 312 (see FIG. 3B) of the identified particular autonomous delivery mechanism 114a and the identified particular non-autonomous delivery mechanism 114b.

Various embodiments of determining the selection 312 (see FIG. 3B) of the identified particular autonomous delivery mechanism 114a and the identified particular non-autonomous delivery mechanism 114b is described below and further described in conjunction with FIG. 3B. The corresponding description below described exemplary embodiments of selecting a particular autonomous delivery mechanism 114a from within the set of autonomous delivery mechanisms 114a. Similarly, the processing engine 144 may perform similar operations for selecting a particular non-autonomous delivery mechanism 114b from within the set of non-autonomous delivery mechanisms 114b.

Selection of Delivery Mechanism(s) Based on Delivery Quotes

In one embodiment, the processing engine 144 may identify the particular autonomous delivery mechanism 114a from among the set of autonomous delivery mechanisms 114a, such that the identified particular autonomous delivery mechanism 114a is associated with the smallest delivery quote 118a from within the set of autonomous delivery mechanisms 114a. For example, assume that the operation server 140 receives delivery metadata 116a-1 and 116a-2 from the servers 112a-1 and servers 112a-2, respectively. The delivery metadata 116a-1 may include delivery time 117a-1 and delivery quote 118a-1. The delivery metadata 116a-2 may include delivery time 117a-2 and delivery quote 118a-2. The processing engine 144 may compare the delivery quote 118a-1 with delivery quote 118a-2. Based on the comparison, the processing engine 144 may determine that the delivery quote 118a-1 is smaller than delivery quote 118a-2.

In this embodiment, the processing engine 144 may perform a similar operation to identify the particular non-autonomous delivery mechanism 114b from the set of non-autonomous delivery mechanisms 114b, such that the identified non-autonomous delivery mechanism 114b is associated with the smallest delivery quote 118b from within the set of non-autonomous delivery mechanism 114b.

In some embodiments, the operation server 140 may receive other delivery metadata 116a from other servers 112a, compare delivery quotes 118a associated with various autonomous delivery mechanisms 114a, and based on the comparison, determine the smallest delivery quote 118a from within the set of autonomous delivery mechanisms 114a.

Selection of Delivery Mechanism(s) Based on Delivery Times

In another embodiment, the processing engine 144 may identify the particular autonomous delivery mechanism 114a from among the set of autonomous delivery mechanisms 114a, such that the identified particular autonomous delivery mechanism 114a is associated with the smallest delivery time 117a from within the set of autonomous delivery mechanisms 114a. For example, the processing engine 144 may compare the delivery time 117a-1 and 117a-2, and determine that the delivery time 117a-1 is smaller than the delivery time 117a-2.

In this embodiment, the processing engine 144 may perform a similar operation to identify the particular non-autonomous delivery mechanism 114b from the set of non-autonomous delivery mechanisms 114b, such that the identified non-autonomous delivery mechanism 114b is associated with the smallest delivery time 117b from within the set of non-autonomous delivery mechanism 114b.

In some embodiments, the operation server 140 may receive other delivery metadata 116a from other servers 112a, compare delivery times 117a associated with various autonomous delivery mechanisms 114a, and based on the comparison, determine the smallest delivery time 117a from within the autonomous delivery mechanisms 114a.

Selection of Delivery Mechanism(s) Based on Delivery Quotes and Delivery Times

In another embodiment, the processing engine 144 may use both the delivery quote 118a and the delivery time 117a to identify the particular autonomous delivery mechanism 114a from among the set of autonomous delivery mechanisms 114a.

For example, the processing engine 144 may identify the particular autonomous delivery mechanism 114a that is associated with the largest weighted sum of a delivery time 117a and a delivery quote 118a within the category of the autonomous delivery mechanisms 114a. For example, the processing engine 144 may calculate a first weighted sum of the delivery time 117a-1 and delivery quote 118a-1 by multiplying a first weight value with the delivery time 117a-1, multiplying a second weight value with the delivery quote 118a-1, and adding them. Similarly, the processing engine 144 may calculate a second weighed sum of the delivery time 117a-2 and delivery quote 118a-2. The processing engine 144 may determine which of the first and second weighed sums is the largest. The processing engine 144 may select an autonomous delivery mechanism 114a that is associated with the largest weight sum of delivery time 117a and delivery quote 118a from among the set of autonomous delivery mechanisms 114a.

In this embodiment, the processing engine 144 may perform a similar operation to identify the particular non-autonomous delivery mechanism 114b from the set of non-autonomous delivery mechanisms 114b, such that the identified non-autonomous delivery mechanism 114b is associated with the largest weighted sum of a delivery time 117b and a delivery quote 118b within the category of the non-autonomous delivery mechanisms 114b.

Selection of Delivery Mechanism(s) Based on Priority Levels

In one embodiment, the processing engine 144 may select a particular autonomous delivery mechanism 114a from among the set of autonomous delivery mechanisms 114a, if the processing engine 144 determines that the particular autonomous delivery mechanism 114a is associated with the top priority level 196 compared to the other autonomous delivery mechanisms 114a.

The processing engine 144 may associate various priority levels 196 to various autonomous delivery mechanisms 114a based on the availability of the various autonomous delivery mechanisms 114a in different local time zone hours, states, cities, areas, and/or the like. For example, the processing engine 144 may associate the first category of autonomous delivery mechanisms 114a-1 to a high priority level 196 in a particular city (e.g., 10 out of 10), if it is determined that the first category of autonomous delivery mechanism 114a-1 provides availability in the particular city more than a threshold availability (e.g., more than ten autonomous delivery mechanisms 114a-1 in the particular city).

Selection of Delivery Mechanism(s) Based on Delivery Times and a Delivery Time Threshold In one embodiment, the processing engine 144 may select a particular autonomous delivery mechanism 114a from the set of autonomous delivery mechanism 114a that is associated with the smallest delivery time 117a from the set of autonomous delivery mechanism 114a, if all the delivery times 117a are less than a first threshold delivery time 197 (e.g., forty-five minutes, fifty minutes, etc.). For example, assume that the first autonomous delivery mechanism 114a-1 is associated with 10 out of 10 priority level 196, and delivery time 117a-1 more than the first threshold delivery time 117; and the second autonomous delivery mechanism 114a-2 is associated with 7 out of 10 priority level 196, and delivery time 117a-2 less than the first threshold delivery time 117. In this example, the processing engine 144 selects the second autonomous delivery mechanism 114a-2.

Thus, even though the first autonomous delivery mechanism 114a-1 is associated with the higher priority level 196, the processing engine 144 selects the second autonomous delivery mechanism 114a-2 because it is associated with the smaller delivery time 117a.

Selection of Delivery Mechanism(s) Based on the Difference Between the Delivery Times and Priority Levels In one embodiment, if the provided delivery times 117a are more than the first threshold delivery time 197, the processing engine 144 calculates the difference between the provided delivery times 117. If the difference between the delivery times 117a is less than or equal to a first time period 198 (e.g., fifteen minutes, twenty minutes, etc.), the processing engine 144 selects a particular autonomous delivery mechanism 114a that is associated with the highest priority level 196. Otherwise, the processing engine 144 selects a particular autonomous delivery mechanism 114a that is associated with the smallest delivery time 117a (within the category of the autonomous delivery mechanisms 114a).

For example, assume that the first autonomous delivery mechanism 114a-1 is associated with the top priority level 196 (e.g., 10 out of 10), and delivery time 117a-1 more than the first delivery time 197 (e.g., fifty-five minutes); and the second autonomous delivery mechanism 114a-2 is associated with a medium priority level 196 (e.g., 7 out of 10), and delivery time 117a-2 more than the first delivery time 197 (e.g., fifty minutes). In this example, the difference between the delivery times 117a-1 and 117a-2 is five minutes which is smaller than the threshold time period 198 (e.g., fifteen minutes). Thus, the processing engine 144 selects the first autonomous delivery mechanism 114a-1 because it is associated with a priority level 196 higher than the second autonomous delivery mechanism 114a-2.

In another example, assume that the first autonomous delivery mechanism 114a-1 is associated with the top priority level 196 (e.g., 10 out of 10), and delivery time 117a-1 more than the first delivery time 197 (e.g., eighty-five minutes); and the second autonomous delivery mechanism 114a-2 is associated with a medium priority level 196 (e.g., 7 out of 10), and delivery time 117a-2 more than the first delivery time 197 (e.g., sixty-five minutes). In this example, the difference between the delivery times 117a-1 and 117a-2 is twenty minutes which is larger than the threshold time period 198 (e.g., fifteen minutes). Thus, the processing engine 144 selects the second autonomous delivery mechanism 114a-2.

Similarly, if there are more than two autonomous delivery mechanisms 114a, the processing engine 144 may evaluate any combination of two of the autonomous delivery mechanisms 114 (similar to that described above), determine the result from the evaluation, and then compare the result of the evaluation with a third autonomous delivery mechanism 114a, and so on.

Selection of Delivery Mechanism(s) Based on a Threshold Delivery Time and a Threshold Delivery Quote In one embodiment, the processing engine 144 may receive a threshold delivery time 197 (e.g., thirty-five minutes, forty minutes, etc.) and a threshold delivery quote 199, for example, from an operator.

In one embodiment, if the delivery times 117a and delivery quotes 118a associated with the autonomous delivery mechanisms 114a fall below the threshold delivery time 197 and the threshold delivery quote 199, respectively, the processing engine 144 selects an autonomous deliver mechanism 114a other than the last order's selected autonomous delivery mechanism 114a.

In one embodiment, if at least one of the received delivery times 117a is less than or equal to the threshold delivery time 197, the processing engine 144 selects a particular autonomous delivery mechanism 114a that is associated with the smallest delivery quote 118a within the autonomous delivery mechanisms 114a.

In one embodiment, if only one received delivery time 117a is less than the threshold delivery time 197, the processing engine 144 selects a particular autonomous delivery mechanism 114a that is associated with the smallest delivery time 117a within the autonomous delivery mechanisms 114a.

In one embodiment, if all the received delivery times 117a are more than or equal to the threshold delivery time 197, the processing engine 144 selects a particular autonomous delivery mechanism 114a that is associated with the smallest delivery time 117a within the autonomous delivery mechanisms 114a.

Selection of Delivery Mechanism(s) Based on the Difference Between the Delivery Quotes In one embodiment, the processing engine 144 may calculate a difference between delivery quotes 118a, and select a particular autonomous delivery mechanism 114a based on the delivery quote difference as described below.

For example, if the delivery quote difference is less than a threshold delivery quote 199, the processing engine 144 may select a particular autonomous delivery mechanism 114a that is associated with the smallest delivery time 117a within the autonomous delivery mechanisms 114a.

In another example, if the delivery quote difference is more than or equal to the threshold delivery quote 199, the processing engine 144 may select a particular autonomous delivery mechanism 114a that is associated with the smallest delivery quote 118a within the autonomous delivery mechanisms 114a.

Adjusting a Selection of Delivery Mechanism(s) Based on a Distribution Percentage and a Distribution Error Tolerance In one embodiment, the processing engine 144 may receive a distribution percentage 193 to each of the autonomous delivery mechanisms 114a, e.g., from an operator. The distribution percentage 193 associated with a particular autonomous delivery mechanism 114a indicates the percentage of times that the particular autonomous delivery mechanism 114a is selected to be included in the selection 312 (see FIG. 3B). Each autonomous delivery mechanism 114a may have a different distribution percentage 193.

The processing engine 144 may also receive a distribution error tolerance 195, e.g., from the operator. The distribution error tolerance 195 indicates the maximum allowed deviation percentage from the distribution percentage 193 for each autonomous delivery mechanism 114a. For example, assume that the first autonomous delivery mechanism 114a-1 is associated with a distribution percentage 193 from 50% to 55%. Also, assume that the distribution error tolerance 195 is 10%. Thus, if the processing engine 144 determines that the first autonomous delivery mechanism 114a-1 is being selected to be included in the selection 312 (see FIG. 3B) 60% of the time in a particular duration of time (e.g., one week, two weeks, etc.), the processing engine 144 determines that the first autonomous delivery mechanism 114a-1 has reached the distribution error tolerance 195 (i.e., the minimum distribution percentage 193+the distribution error tolerance 195=50%+10%). In response, the processing engine 144 may implement distribution control, such that the first autonomous delivery mechanism 114a-1 is not offered until its distribution percentage 193 returns to 50% to 55%.

The processing engine 144 may perform similar operations described above for selecting a particular non-autonomous delivery mechanism 114b from within the set of non-autonomous delivery mechanisms 114b.

Operational Flow for Selecting a Particular Autonomous and a Particular Non-Autonomous Delivery Mechanism FIG. 2 illustrates an exemplary operational flow 200 of the system 100 of FIGS. 1A and 1B. The operational flow 200 begins when the interaction session 152 is initiated on the computing device 120a. For example, the interaction session 152 may be initiated when the user 102a accesses the delivery user interface 132. During this process, the computing device 120a presents a plurality of objects 134 selectable to order on the delivery user interface 132. The user 102a may select one or more objects 134 on the delivery user interface 132. The computing device 120a updates the content of the memory resource 136 as one or more objects 134 are added to the memory resource 136.

The computing device 120a may send a message 202 to the operation server 140 that indicates the interaction session 152 is initiated. In response, the operation server 140 (e.g., via the processing engine 144) may send a request message 204 to the servers 112 to provide delivery metadata 116. The request message 204 may include a request to deliver an order 170 (e.g., the set of objects 134a), the pickup location coordinate 106 of the order 170, and the delivery location coordinate 108 of the order 170.

The operation server 140 may receive a first set of delivery metadata 116a from the servers 112a associated one or more with autonomous delivery mechanisms 114a. The processing engine 144 may identify a particular autonomous delivery mechanism 114a from among the autonomous delivery mechanisms 114a based on the first set of delivery metadata 116a, similar to that described in FIGS. 1A and 1B.

The operation server 140 may receive a second set of delivery metadata 116b from the servers 112b associated with one or more non-autonomous delivery mechanisms 114b. The processing engine 144 may identify a particular non-autonomous delivery mechanism 114b from among the non-autonomous delivery mechanisms 114b based on the second set of delivery metadata 116b, similar to that described in FIGS. 1A and 1B.

The processing engine 144 may communicate a message 206 to the computing device 120a. The message 206 may include the identified particular autonomous delivery mechanism 114a and the identified particular non-autonomous delivery mechanism 114b to the computing device 120a. The message 206 may include the selection 312 described in FIG. 3B.

In one embodiment, the processing engine 144 may also communicate delivery metadata 116a associated with the identified particular autonomous delivery mechanism 114a, and delivery metadata 116b associated with the identified particular non-autonomous delivery mechanism 114b to the computing device 120a, e.g., via the message 206. Thus, the computing device 120a may receive the delivery metadata 116a associated with the identified particular autonomous delivery mechanism 114a, and the delivery metadata 116b associated with the identified particular non-autonomous delivery mechanism 114b from the operation server 140, e.g., while updating the content of the memory resource 136.

The computing device 120a and/or the processing engine 144 may calculate an average of the delivery time 117a (associated with the identified particular autonomous delivery mechanism 114a) and the delivery time 117b (associated with the identified particular non-autonomous delivery mechanism 114b). The computing device 120a may present (or display) the average delivery times 117 on the delivery user interface 132, such that described in FIG. 3A. The user 102a may finalize the content of the memory resource 136 and proceed to select a delivery mechanism 114, such that described in FIG. 3B. The user 102a may proceed to conclude the operation 176 associated with the memory resource 136, similar to that described in FIG. 3C.

For example, assume that from the selection of the identified autonomous delivery mechanism 114a-1 and the identified non-autonomous delivery mechanism 114b-1, the identified autonomous delivery mechanism 114a-1 is selected by the user 102a. The computing device 120a and/or the operation server 140 may present a message that indicates the selected autonomous delivery mechanism 114a-1 on the delivery user interface 132, e.g., similar to that described in FIG. 3C.

After the operation associated with the memory resource 136 is concluded, the computing device 120a sends a message 208 indicating that the operation 176 associated with the memory resource 136 is concluded to the operation server 140.

Sending Status Updates Associated with the Memory Resource

In response to receiving the message 208, the operation server 140 may send a message 210 to the computing device 120a that comprises event-triggered metadata 158a. The event-triggered metadata 158a may comprise Application Programming Interface (API) responses, webhooks, and/or the like.

The event-triggered metadata 158a may comprise status updates 160 associated with the ordered objects 134a. For example, the computing device 120a and/or the operation server 140 may present the status update 160 that indicates the set of objects 134a is added to the memory resource 136 on the delivery user interface 132, similar to that described in FIG. 3D.

The computing device 120*b* and/or the operation server 140 may continue to present status updates 160 on the delivery user interface 132 until the autonomous delivery mechanism 114*a*-1 arrives at the delivery location coordinate 108. Thus, the computing device 120*b* and/or the operation server 140 may continue to present the event-triggered metadata 158 that comprises a set of status updates 160 on the delivery user interface 132 until the autonomous delivery mechanism 114*a*-1 arrives at the delivery location coordinate 108. Exemplary screenshots of the delivery user interface 132 where the set of status updates 160 are presented are illustrated in FIGS. 3D to 3I.

Presenting a Set of Instructions for Preparing the Content of the Memory Resource Further, in response to receiving the message 208, the operation server 140 may send a message 212 to the computing device 120*b* that indicates a new set of objects 134*a* is added to the memory resource 136.

The computing device 120*b* and/or the operation server 140 may present (or display) the message 212 on the user interface 129, e.g., similar to that described in FIG. 4A. The quote of the message 212 may be an indication that the operation 176 associated with the memory resource 136 is concluded. The message 212 may comprise the content of the memory resource 136, the set of instructions 154, among any other information/instructions.

The processing engine 144 may generate the set of instructions 154. The set of instructions 154 may be determined based on the objects 134*a* in the memory resource 136. The set of instructions 154 may comprise instructions to prepare the set of objects 134*a* in a particular sequence. For example, assume that the set of objects 134*a* comprises an above-ambient temperature object 134*a* (e.g., an object that needs to be heated in an oven), an ambient temperature object 134*a* (e.g., a room temperature object), and a below-ambient temperature object 134*a* (e.g., a frozen object). In this example, the set of instructions 154 may indicate to prepare the above-ambient temperature 134*a* first, the ambient-temperature object 134*a* second, and the below-ambient temperature object 134*a* third. Thus, the set of instructions 154 may generally indicate to prepare one or more above-ambient temperature objects 134*a* first, one or more ambient temperature objects 134*a* second, and one or more below-ambient temperature objects 134*a* third.

In one embodiment, the set of instructions 154 may include locations of the objects 134*a*, such as pathway numbers within a physical space 111. The operation server 140 may determine the locations of the objects 134*a* based on map data 194 that includes locations of objects 134 within the physical space 111. During the preparation of the objects 134*a*, the user 102*b* may place the objects 134*a* in one or more containers or compartments. The operations of generating and presenting the set of instructions 154 are described further below in conjunction with the methods 700 and 1000.

Upon receiving the message 212, the user 102*b* can acknowledge that the new order comprising the set of objects 134*a* is received, e.g., by pressing an acknowledge button on the user interface 129. In response, the computing device 120*b* sends an acknowledgment message 214 that confirms receiving the content of the memory resource 136 to the operation server 140.

In response to receiving the acknowledgment message 214, the operation server 140 may forward the message 214 to the computing device 120*a*. For example, the operation server 140 may present the status update 160 of the content of the memory resource 136 that they are being prepared, similar to that described in FIG. 3E. When the objects 134*a* are prepared e.g., by the user 102*b* before or after the autonomous delivery mechanism 114*a*-1 arrives at the pickup location 108, the computing device 120*b* may send a message 226 to the operation server 140 that indicates the objects 134*a* are ready for pickup. The operation server 140 may forward the message 226 to the computing device 120*a* to be displayed on the delivery user interface 132, similar to that described in FIG. 3F.

Requesting to Book the Selected Delivery Mechanism

In response to receiving the acknowledgment message 214, the operation server 140 may send a request message 216 to the server 112*a*-1 (associated with the selected autonomous delivery mechanism 114*a*-1) to book the selected autonomous delivery mechanism 114*a*-1 to make a first stop at the pickup location coordinate 106 (so that the ordered objects 134*a* can be placed in the selected autonomous delivery mechanism 114*a*-1) and make a second stop at the delivery location coordinate 108 (so that the user 102*a* can receive the ordered objects 134*a* from the selected autonomous delivery mechanism 114*a*-1).

Presenting Status Updates Associated with the Selected Delivery Mechanism

The request message 216 may further indicate to provide a set of event-triggered metadata 158*b* that indicate status updates 160 associated with the autonomous delivery mechanism 114*a*-1. The event-triggered metadata 158*b* may comprise API responses, webhooks, and/or the like.

The operation server 140 receives the set of event-triggered metadata 158*b* from the server 112*a*-1, where the set of event-triggered metadata 158*b* indicates status updates 160 associated with the selected autonomous delivery mechanism 114*a*-1. The operation server 140 forwards the set of event-triggered metadata 158*b* to the computing device 120*a*.

The operation server 140 may receive various event-triggered metadata 158*b* from the server 112*a*-1 at various stages until the autonomous delivery mechanism 114*a*-1 arrives at the delivery location coordinate 108.

For example, the operation server 140 may receive various event-triggered metadata 158*b* associated with the autonomous delivery mechanism 114*a*-1, including 1) when the autonomous delivery mechanism 114*a*-1 is scheduled or booked to deliver the set of objects 134*a* to the delivery location coordinate 108, 2) when the autonomous delivery mechanism 114*a*-1 is on the way toward the pickup location coordinate 106, 3) when the autonomous delivery mechanism 114*a*-1 arrives at the pickup location coordinate 106, 4) when the autonomous delivery mechanism 114*a*-1 is waiting at the pickup location coordinate 106 (e.g., to be loaded with the ordered objects 134*a*), 5) when the autonomous delivery mechanism 114*a*-1 is being loaded with the ordered objects 134*a*, 6) when the autonomous delivery mechanism 114*a*-1 in on the way toward the delivery location coordinate 108, 7) when the autonomous delivery mechanism 114*a*-1 arrives at the delivery location coordinate 108, 8) when the autonomous delivery mechanism 114*a*-1 is waiting at the delivery location coordinate 108 (e.g., until the user 102*a* retrieves the ordered objects 134*a* from the autonomous delivery mechanism 114*a*-1), 8) when the ordered objects 134*a* are being retrieved from the autonomous delivery mechanism 114*a*-1, 9) when the delivery is complete, 10) when the delivery is canceled, 11) when the autonomous delivery mechanism 114*a*-1 is heading back to a parking station (or landing station), 12) when the autonomous delivery mechanism 114*a*-1 is arrived at the parking station, and 13) when the autonomous delivery mechanism 114a-1 is being unloaded at the parking station.

The operation server 140 may forward any of these event-triggered metadata 158b that represents status updates 160 associated with the autonomous delivery mechanism 114a-1 to the computing device 120a to be presented on the delivery user interface 132 and/or to the computing device 120b to be presented on the user interface 129 at appropriate times, similar to that described herein. The operation server 140 may present the set of status updates 160 on a status update element 326. For example, upon receiving each of the set of status updates 160, the operation server 140 displays and/or highlights each of the status updates 160 in the status update element 326, similar to that described in FIGS. 3D to 3I.

In one embodiment, the operation server 140 may also receive a hyperlink 188 from the server 112a-1, that upon access the drop-off location 108 is displayed on a virtual map 324. The operation server 140 uses the hyperlink 188 to integrate an adjust drop-off element 322 into the delivery user interface 132. This process is described in FIGS. 3G and 9.

The Delivery Mechanism Arrives at the Pickup Location Coordinate

The operation server 140 receives a message 218 that indicates the selected autonomous delivery mechanism 114a-1 has arrived at the pickup location coordinate 106. The message 218 may include delivery mechanism metadata 162. The delivery mechanism metadata 162 may include a pin number 164 that is used to unlock the selected autonomous delivery mechanism 114a-1 and an identifier 166 that uniquely identifies the selected autonomous delivery mechanism 114a-1. For example, the identifier 166 may include a plate number, a serial number, or any other unique identifier associated with the autonomous delivery mechanism 114a-1.

The operation server 140 forwards the message 218 to the computing device 120a. The message 218 may also include event-triggered metadata 158b that indicates that the autonomous delivery mechanism 114a-1 has arrived at the pickup location coordinate 106, similar to that described in FIG. 3G. The operation server 140 may also forward the message 218 to the computing device 120b. The operation server 140 and/or the computing device 120b may present the message 218 on the user interface 129, similar to that shown in FIG. 4D.

The operation server 140 may receive an acknowledgment message 220 from the computing device 120b that indicates the ordered objects 134a are loaded into the autonomous delivery mechanism 114a-1.

In one embodiment, in response to not receiving an acknowledgment message 220 that the autonomous delivery mechanism 114a-1 is loaded with the ordered objects 134a within a threshold time period 168 (e.g., two minutes, five minutes, etc.) from the computing device 120b, the operation server 140 may send a reminder message 420 (see FIG. 4E) to the computing device 120b that the autonomous delivery mechanism 114a-1 is waiting at the pickup location coordinate 106. For example, the operation server 140 and/or the computing device 120b may present the reminder message 420 on the user interface 129, similar to that shown in FIG. 4E.

Confirming the Content of the Memory Resource Before Loading into the Delivery Mechanism In one embodiment, the user 102b may confirm the ordered objects 134a and the name of the user 102a associated with the interaction session 152 on the user interface 129 before loading the ordered objects 134 in the autonomous delivery mechanism 114a-1. For example, the operation server 140 and/or the computing device 120b may present the ordered objects 134a and the name of the user 102a on the user interface 129 to be confirmed by the user 102b, similar to that shown in FIG. 4F. The operation server 140 and the computing device 120b may receive confirmation that this information is verified, e.g., when the user 102b presses a confirmation button 424 (see FIG. 4F) on the user interface 129, similar to that shown in FIG. 4F.

Figure 4G:
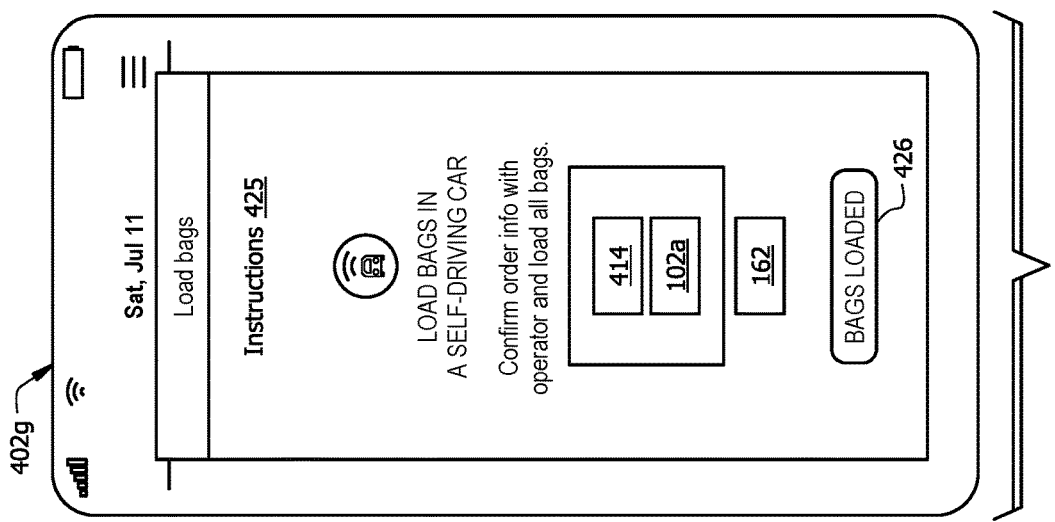

Upon receiving the confirmation that the ordered objects 134a and the name of the user 102a are verified, the operation server 140 presents instructions 425 (see FIG. 4G) to load the ordered objects 134a in the autonomous delivery mechanism 114a-1, similar to that shown in FIG. 4G.

The user 102b may identify the autonomous delivery mechanism 114a-1 that is arrived at the pickup location coordinate 106 using the identifier 166.

In one embodiment, the user 102b may input the pin number 164 to a computing device associated with (and accessible from outside of) the autonomous delivery mechanism 114a-1. For example, the user 102a may input the pin number 164 on a keypad and/or touch-display screen of the computing device associated with the autonomous delivery mechanism 114a-1.

The user 102b can confirm that the ordered objects 134a are loaded in the autonomous delivery mechanism 114a-1, e.g., by pressing a button 426, similar to that shown in FIG. 4G.

The computing device 120b sends a message 220 to the operation server 140 that indicates the ordered objects 134a are loaded in the autonomous delivery mechanism 114a-1.

The Delivery Mechanism Heading Toward the Delivery Location Coordinate

Once the autonomous delivery mechanism 114a-1 is on a route toward the delivery location coordinate 108, the server 112a-1 sends event-triggered metadata 158b to the operation server 140 that indicates the autonomous delivery mechanism 114a-1 is on the way toward the delivery location coordinate 108.

In response, the operation server 140 updates the status of the autonomous delivery mechanism 114a-1 to indicate that the autonomous delivery mechanism 114a-1 is on the way to the delivery location coordinate 108. For example, the operation server 140 and/or the computing device 120a may present status update 160 of the autonomous delivery mechanism 114a-1 on the delivery user interface 132, such that the "on its way" status update is checked, similar to that described in FIG. 3G.

The Delivery Mechanism Arrives at the Delivery Location Coordinate

When the autonomous delivery mechanism 114a-1 arrives at the delivery location coordinate 108, the server 112a-1 sends a message 222 to the operation server 140 that indicates the autonomous delivery mechanism 114a-1 has arrived at the delivery location coordinate 108. The message 222 may include event-triggered metadata 158b that indicates a status update 160 associated with the autonomous delivery mechanism 114a-1, such that the status of the autonomous delivery mechanism 114a-1 is changed from on the way to arrived.

The operation server 140 forwards the message 222 to the computing device 120a. For example, the operation server 140 and/or the computing device 120a may present the status update 160 of the autonomous delivery mechanism 114a-1 on the delivery user interface 132, such that the "arrived" checkmark is checked, similar to that shown in FIG. 3G. The message 222 may further include the delivery mechanism metadata 162, such as the pin number 164, the name of the user 102a, and the identifier 166 (see FIG. 1B).

Upon receiving the message 222, the user 102a can find the autonomous delivery mechanism 114a-1 at the delivery location coordinate 108, and identify the autonomous delivery mechanism 114a-1 using the identifier 166. The user 102a can input the pin number 166 into a computing device associated with the autonomous delivery mechanism 114a-1 to unlock the autonomous delivery mechanism 114a-1. The user 102a, then, can retrieve the ordered objects 134a from the autonomous delivery mechanism 114a-1.

In one embodiment, the user 102a can confirm on the delivery user interface 132 that the ordered objects 134a are retrieved from the autonomous delivery mechanism 114a-1 on the delivery user interface 132. In response, the computing device 120a may send a message 224 to the operation server 140 that indicates the ordered objects 134a are retrieved from the autonomous delivery mechanism 114a-1. The operation server 140 may forward the message 224 to the server 112a-1.

Although, FIG. 2 illustrates an example operational flow 200 where the autonomous delivery mechanism 114a-1 is selected, in other examples of the operational flow 200, a non-autonomous delivery mechanism 114b may be selected.

Example User-Side Experience Operational Flow

FIGS. 3A to 3I illustrate an exemplary user-side experience operational flow 300 describing user interaction with the delivery user interface 132. In some embodiments, the user-side experience operational flow 300 may include one or more steps and/or functions of one or more components of system 100 described in FIGS. 1A and 1B and performed during the operational flow 200 described in FIG. 2. In the illustrated embodiment of FIGS. 3A to 3I, exemplary screenshots 302a to 302i of the delivery user interface 132 at different stages of the operational flow 200 (see FIG. 2) are illustrated. It should be noted that the screenshots 302a to 302h are for illustration purposes and are not meant to limit the scope of the present disclosure. The screenshots 302a to 302i may include the illustrated information, in addition to or instead of any other information. Some aspects of screenshots 302a to 302h are described above with respect to FIG. 2, and additional aspects are described below.

In one embodiment, the user-side experience operational flow 300 begins when the interaction session 152 is initiated on the delivery user interface 132. For example, during the interaction session 152, the user 102a may add one or more objects 134 to the memory resource 136.

FIG. 3A illustrates an exemplary screenshot 302a of the delivery user interface 132 that shows the summary of the interaction session 152. In the example of screenshot 302a, the delivery address 304, the average estimated delivery time 117, a phone number associated with the user 102a, the driver note 306, the contact-less delivery option 308, and the content of the memory resource 136 are presented by the computing device 120a and/or the operation server 140. In other examples, the computing device 120a and/or the operation server 140 may present any other information on the screenshot 302a.

The delivery address 304 may be associated with the delivery location coordinate 108 (see FIG. 1B). The user 102a can leave a note for a driver of a delivery mechanism 114 using the driver note 306.

With respect to the contact-less delivery option 308, the contact-less delivery option 308, for example, may indicate that the user 102a wants the ordered objects 134a to be placed outside their door. In some embodiments, if the computing device 120a and/or the operation server 140 determine that the contact-less delivery option 308 is selected, autonomous delivery mechanisms 114a (see FIG. 1A) are excluded from consideration in providing the selection 312 of an autonomous delivery mechanism 114a and a non-autonomous delivery mechanism 114b, described in FIGS. 1 and 2.

In the example of screenshot 302a, the content of the memory resource 136 includes objects 134a-1, 134a-2, and 134a-N. The user 102a is able to update the content of the memory resource 136 by adjusting a quantity of each object 134a. The user 102a may confirm the content of the memory resource 136, for example, by pressing the button 310. Once the content of the memory resource 136 is finalized, the computing device 120a and/or the operation server 140 may present the exemplary screenshot 302b of the delivery user interface 132, shown in FIG. 3B.

FIG. 3B illustrates the exemplary screenshot 302b of the delivery user interface 132.

In the example of screenshot 302b, the content of the memory resource 136, the delivery address 304, delivery time 117, and the selection 312 of the autonomous delivery mechanism 114a-1 and non-autonomous delivery mechanism 114b-1 are presented by the computing device 120a and/or the operation server 140.

In one embodiment, the delivery metadata 116a-1 associated with the autonomous delivery mechanism 114a-1, and the delivery metadata 116b-1 associated with the non-autonomous delivery mechanism 114b-1 may be presented on the screenshot 320b. For example, the delivery metadata 116a-1 may include one or both of the delivery time 117a-1 and the delivery quote 118a-1, similar to that described in FIGS. 1 and 2. Similarly, the delivery metadata 116b-1 may include one or both of the delivery time 117b-1 and the delivery quote 118b-1, similar to that described in FIGS. 1 and 2.

The user 102a may select one of the delivery mechanisms 114 presented in the selection list 312, e.g., by pressing a "select" button 314. Upon detecting that one of the delivery mechanisms 114 presented in the selection list 312 is selected, and that the select button 314 is pressed, the computing device 120a and/or the operation server 140 may present an exemplary screenshot 302c of the delivery user interface 132, shown in FIG. 3C.

In one embodiment, if the operation server 140 receives a message from the server 112a-1 that the selected autonomous delivery mechanism 114a-1 is no longer available, the operation server 140 and/or the computing device 120a may present a message on the selected autonomous delivery mechanism 114a-1 is no longer available. In response, the user 102a can select another option from the selection 312, e.g., the non-autonomous delivery mechanism 114b-1.

In another embodiment, if the operation server 140 receives a message from the server 112a-1 that the selected autonomous delivery mechanism 114a-1 is no longer available, the operation server 140 and/or the computing device 120a may present a message on the delivery user interface 132 that indicates the non-autonomous delivery mechanism 114b-1 (e.g., from the selection 312) is selected. The operation server 140 may then communicate with a server 112 associated with the non-autonomous delivery mechanism 114b-1 to continue performing the operational flow 200 described in FIG. 2. In other words, if the operation server 140 receives a message from the server 112a-1 that the selected delivery mechanism 114 is no longer available, the operation server 140 and/or the computing device 120a may choose a default or predetermined available delivery mechanism 114 for delivering the objects 134a. The default or predetermined available delivery mechanism 114 may be autonomous or non-autonomous. In response, the operation server 140 and/or the computing device 120a may present a message on the delivery user interface 132 that indicates the default or predetermined available delivery mechanism 114 is selected. The operation server 140 may then communicate with a server 112 associated with the or predetermined available delivery mechanism 114 to continue performing the operational flow 200 described in FIG. 2.

Figures 3C, 3D:
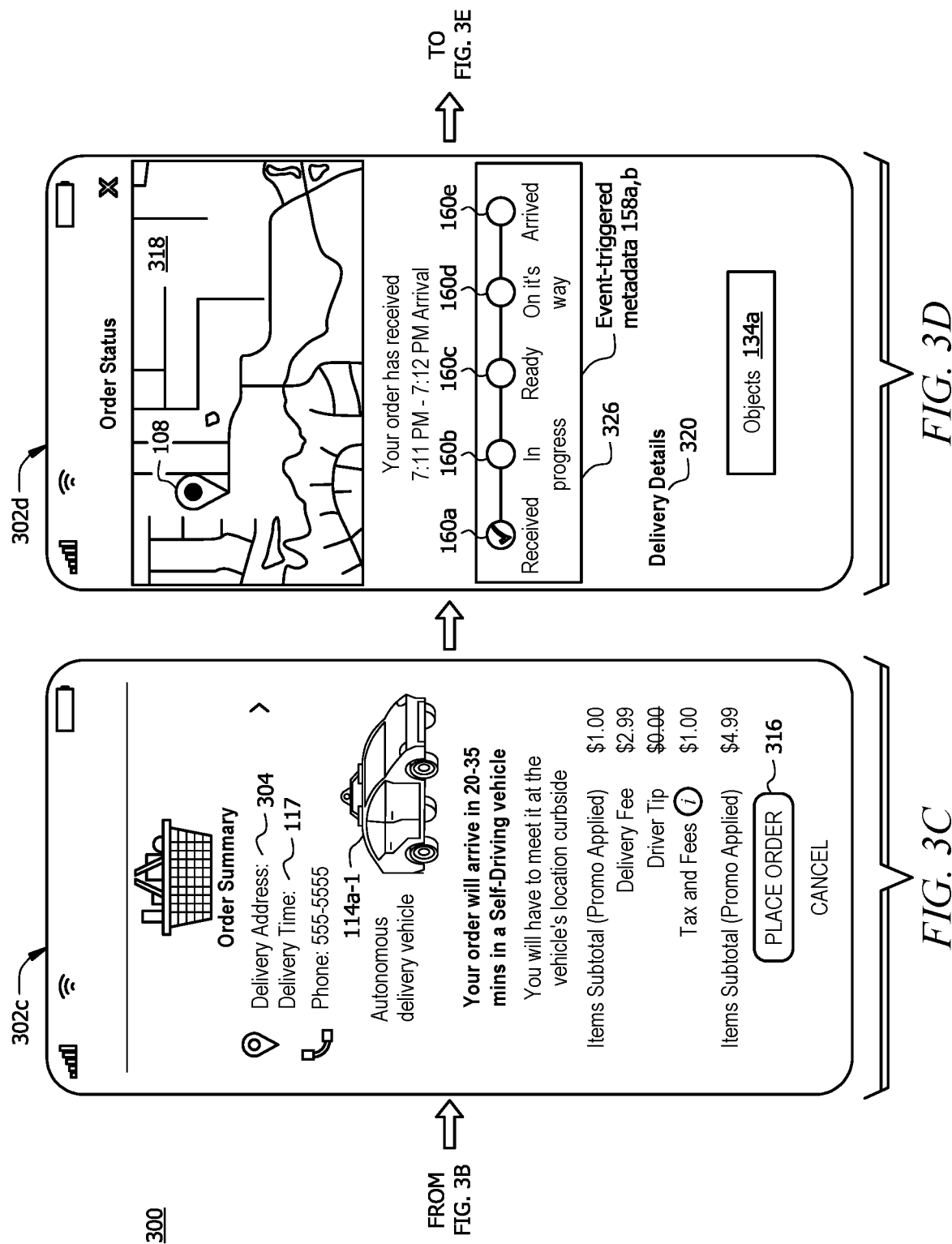

FIG. 3C illustrates the exemplary screenshot 302c of the delivery user interface 132 that shows the selected delivery mechanism 114, where the selected delivery mechanism 114 is the autonomous delivery mechanism 114a-1. The user 102a can confirm the order (that comprises the content of the memory resource 136) and the selected autonomous delivery mechanism 114a-1 on the delivery user interface 132, by pressing the "place order" button 316.

In response, the operation server 140 concludes the operation 176 (see FIG. 1B) associated with the memory resource 136. The operation 176 may include the cost of the content of the memory resource 136 and the delivery time 117a-1 associated with the selected autonomous delivery mechanism 114a-1. In response, the computing device 120a and/or the operation server 140 may present an exemplary screenshot 302d of the delivery user interface 132, shown in FIG. 3D.

FIG. 3D illustrates the exemplary screenshot 302d of the delivery user interface 132.

The computing device 120a and/or the operation server 140 may present a map 318, the event-triggered metadata 158, the delivery details 320, and the content of the memory resource 136 on the screenshot 320d. The computing device 120a and/or the operation server 140 may present the delivery location coordinate 108 on the map 318. At this stage where the order has just been received, in the event-triggered metadata 158a, 158b, the status update 160a is presented or highlighted, e.g., by a check mark.

The delivery details 320 may include the name of the user 102a, the delivery address, the phone number associated with the user 102a, etc.

FIGS. 3E to 3I illustrate exemplary screenshots 302e to 302h of the delivery user interface 132, where the event-triggered metadata 158a, 158b indicates various status updates 160 (or status changes) of the ordered objects 134a and/or the selected autonomous delivery mechanism 114a-1.

The computing device 120a and/or the operation server 140 may present the location coordinate 328 associated with the autonomous delivery mechanism 114a-1 (e.g., in real-time) on the map 318, as illustrated in FIGS. 3E to 3I.

The operation server 140 may determine the location coordinate 328 associated with the autonomous delivery mechanism 114a-1 based on tracking data 192 (see FIG. 1) that is received from the server 112a-1. This process is described in detail in method 1000 described in FIG. 10.

FIG. 3E illustrates an exemplary screenshot 302e of the delivery user interface 132. The computing device 120a and/or the operation server 140 may display the screenshot 302e, when the operation server 140 receives the acknowledgment message 214 from the computing device 120b, similar to that described in FIG. 2.

At this stage, the ordered objects 134a are being prepared by the user 102b, similar to that described in FIG. 2. Thus, the status update 160b may be highlighted. In the example of screenshot 302e, the status update 160b may indicate that the preparation of the ordered objects 134a is in progress.

FIG. 3F illustrates an exemplary screenshot 302f of the delivery user interface 132.

The computing device 120a and/or the operation server 140 may display the screenshot 302f, when the operation server 140 receives a message from the computing device 120b that indicates the ordered objects 134a are prepared, and ready to be loaded in the selected autonomous delivery mechanism 114a-1. In response, the computing device 120a and/or the operation server 140 may trigger the status update 160c to be highlighted, similar to that shown in FIG. 3F.

Figure 3G:
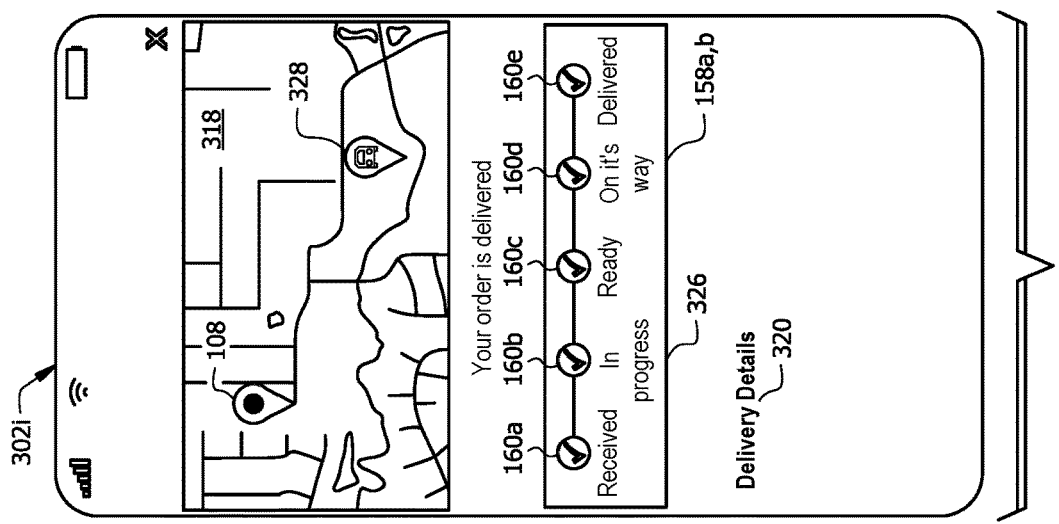

FIG. 3G illustrates an exemplary screenshot 302g of the delivery user interface 132. The computing device 120a and/or the operation server 140 may display the screenshot 302g, when the operation server 140 receives the message 220 (see FIG. 2) from the computing device 120b, similar to that described in FIG. 2.

At this stage, the ordered objects 134a are loaded in the selected delivery mechanism 114a-1, e.g., by the user 102b (see FIG. 1A), similar to that described in FIG. 2. In response, the computing device 120a and/or the operation server 140 may trigger the status update 160d to be highlighted, similar to that shown in FIG. 3G.

In the example of screenshot 302g, the identifier 166 of the selected autonomous delivery mechanism 114a-1 is shown. The user 102a can use the identifier 166 to identify the selected autonomous delivery mechanism 114a-1.

Further, the computing device 120a and/or the operation server 140 may display the adjust drop-off element 322 on the delivery user interface 132. The adjust drop-off element 322 may be programmed and/or configured such that upon access, a virtual map 324 is displayed on the delivery user interface 132, where the delivery location coordinate 108 can be adjusted on the virtual map 324. Thus, in this manner, the adjust drop-off element 322 allows adjusting the delivery location coordinate 108 within the delivery user interface 132. The operation server 140 is configured to integrate the adjust drop-off element 322 into the delivery user interface 132. The process of integrating the adjust drop-off element 322 into the delivery user interface 132 is described further below in conjunction with the method 900 described in FIG. 9.

Figure 3H:
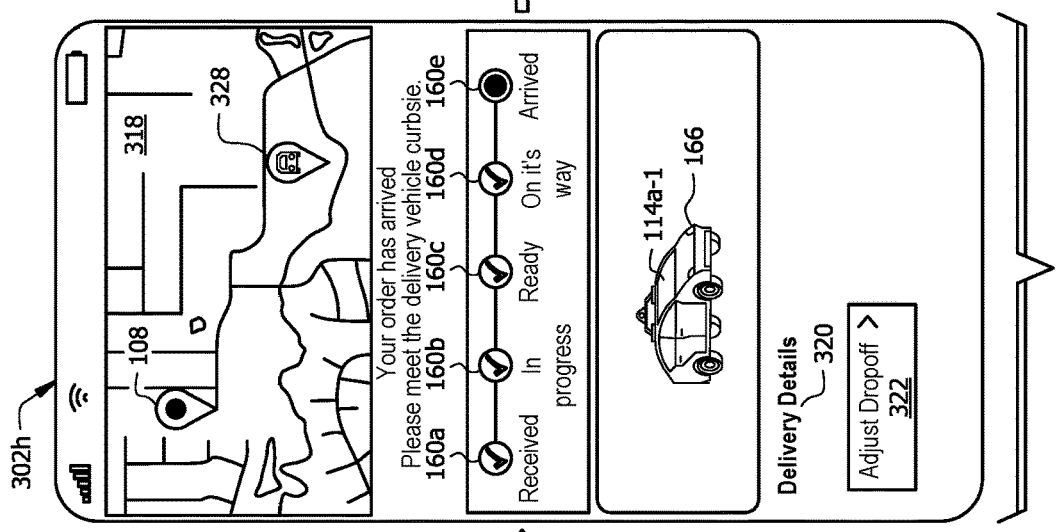

FIG. 3H illustrates an exemplary screenshot 302h of the delivery user interface 132. The computing device 120a and/or the operation server 140 may display the screenshot 302h, when the operation server 140 receives the message 222 (see FIG. 2) from the server 112a-1 that indicates the delivery mechanism 114a-1 has arrived at the delivery location coordinate 108, similar to that described in FIG. 2. In response, the computing device 120a and/or the operation server 140 may trigger the status update 160e to be highlighted, similar to that shown in FIG. 3H.

Figure 3I:
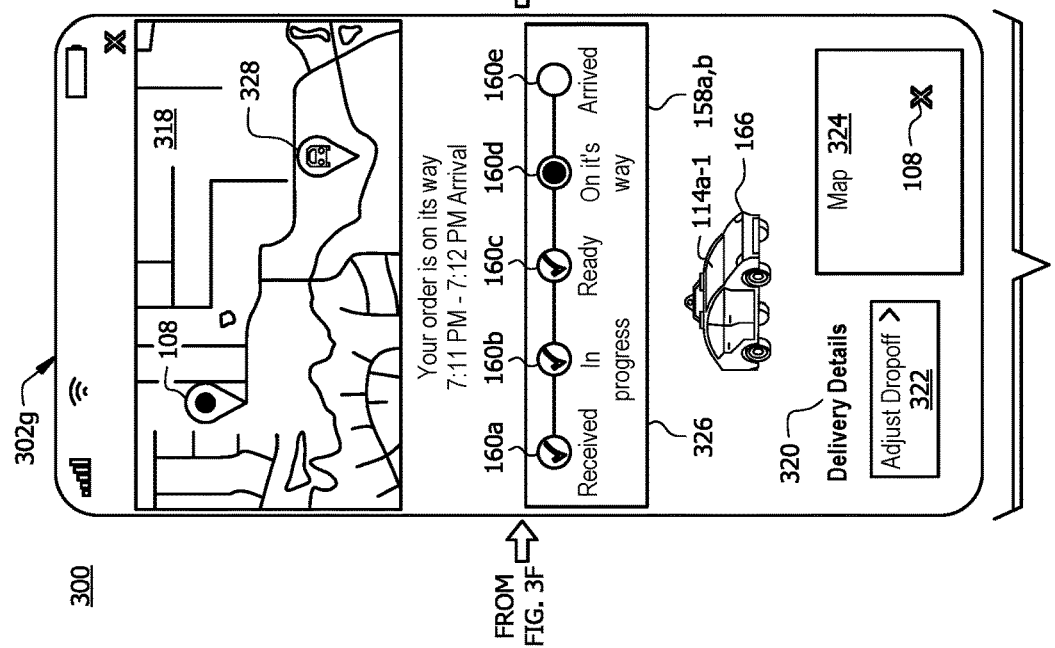

FIG. 3I illustrates an exemplary screenshot 302i of the delivery user interface 132. The computing device 120a and/or the operation server 140 may display the screenshot 320i when it is determined that the ordered objects 134a are retrieved from the delivery mechanism 114a-1. For example, the operation server 140 may determine that the ordered objects 134a are retrieved from the delivery mechanism 114a-1 when the operation server 140 receives the message 224 (see FIG. 2) from the computing device 120a that indicates the ordered objects 134a are retrieved from the delivery mechanism 114a-1. In response, the computing device 120a and/or the operation server 140 may trigger the text associated with the status update 160e to be changed, for example, from "arrived" to "delivered," as shown in FIG. 3I.

Example User-Side Experience Operational Flow

FIGS. 4A to 4G illustrate an exemplary user-side experience operational flow 400 describing associate interaction with the user interface 129. In some embodiments, the user-side experience operational flow 400 may include one or more steps and/or functions of one or more components of system 100 described in FIGS. 1A and 1B and performed during the operational flow 200 described in FIG. 2. In the illustrated embodiment of FIGS. 4A to 4G, exemplary screenshots 402a to 402g of the user interface 129 at different stages of the operational flow 200 (see FIG. 2) are illustrated. It should be noted that the screenshots 402a to 402g are for illustration purposes and are not meant to limit the scope of the present disclosure. The screenshots 402a to 402g may include the illustrated information, in addition to or instead of any other information. Some aspects of screenshots 402a to 402g are described above with respect to FIGS. 2 and 3A-3I, and additional aspects are described below.

In one embodiment, the user-side operational flow 400 may begin when the computing device 120b receives the message 212 from the operation server 140, similar to that described in FIG. 2.

In response, the computing device 120b and/or the operation server 140 may present the content of the memory resource 136 and the set of instructions 154 on the user interface 129, similar to that shown in screenshot 402 of the user interface 129 shown in FIG. 4A.

In the example of FIG. 4A, the set of instructions 154 may include instructions to prepare the ordered objects 134a in the memory resource 136 in a particular sequence, similar to that described in FIG. 2.

Once any of the objects 134a is prepared and/or fetched, the user 102b can indicate the completion of preparing the object 134a by pressing a corresponding fulfilled button 406. Alternatively or in addition, the completion of preparing the objects 134a may be indicated upon scanning the objects 134a (or the barcode of the objects 134a), similar to that described in FIG. 4A.

In one embodiment, the set of instructions 154 may include locations 404 associated with the ordered objects 134a in the physical space 111, e.g., pathway numbers. The set of instructions 154 may indicate to retrieve the ordered objects 134a from their locations 404 in a particular sequence so that the speed of the preparation of the objects 134a is more optimized.

In on example, the set of instructions 154 may include first scheduling instructions 154a (see FIG. 1B) that indicate to prepare the plurality of objects 134a such that a first timestamp 178a (see FIG. 1) that indicates the above-ambient temperature objects 134a are ready to be prepared is synchronized with a second timestamp 178b (see FIG. 1B) that indicates when the delivery mechanism 114 will reach the pickup location coordinate 106.

In another example, the set of instructions 154 may include second scheduling instructions 154b (see FIG. 1B) that indicate to prepare the plurality of objects 134a such that a third timestamp 178c (see FIG. 1B) that indicates the above-temperature objects 134a is ready for pickup is synchronized with a fourth timestamp 178d (see FIG. 1) that indicates when the delivery mechanism 114 has reached the pickup location coordinate 106.

Further, in the example of FIG. 4A, a portion 408 of the user interface 129 may be used to scan bar code, Quick Response (QR) code, or any other code associated with the objects 134a. For example, a camera associated with the computing device 120b may be used to scan the bar code of an object 134a, when the object 134a is placed in front of the field-of-view of the camera.

An interaction session ID 414 may be shown on the screenshot 402a of the user interface 129, e.g., in the portion 408. The interaction session ID 414 may be used to uniquely identify the interaction session 152, the content of the memory resource 136, and/or any information associated with the interaction session 152.

In some cases, some objects 134a may not have bar code. In such cases, an object detection, an object recognition, a computer vision, and/or any image processing algorithm may be implemented for recognizing the objects 134a. For example, the image processing algorithm may be implemented in the computing device 120b and/or the operation server 140. When the object 134a is recognized by the image processing algorithm, the fulfilled button 406 associated with the object 134a may be checked.

In some embodiments, a first object 134a may not be in the resource data 182 associated with the physical space 111. Thus, the operation server 140 may substitute another object 134a that is similar to or corresponds to the first object 134a, and include the substituted object 134a in the memory resource 136.

Upon determining that all the objects 134a are prepared, and that the preparation process is fulfilled, the computing device 120b and/or the operation server 140 may display the confirmation message 410 on the user interface 129, similar to that shown in FIG. 4B.

FIG. 4B illustrates an exemplary screenshot 402b of the user interface 129. In the screenshot 402b, the confirmation message 410 is illustrated.

In response to the confirmation message 410, the computing device 120b and/or the operation server 140 may display a message 412 on the user interface 129 that indicates the ordered objects 134a have been prepared, and ready to be loaded into the delivery mechanism 114, similar to that shown in FIG. 4C. In one embodiment, the operation server 140 may display one or more messages on the user interface 129 that indicates the autonomous delivery mechanism 114a-1 will arrive at the pick up location 106 in a particular time, e.g., in five minutes, in ten minutes, etc. based on data, e.g., event-triggered metadata 158b that is received from the server 112a-1.

FIG. 4C illustrates an exemplary screenshot 402c of the user interface 129. In the example of FIG. 4C, the message 412, the interaction session ID 414, the name of the user 102a, and a button 418 are shown. The user 102b can press the button 418 to indicate that the process of loading the ordered objects 134a into the autonomous delivery mechanism 134a has begun.

FIG. 4D illustrates an exemplary screenshot 402d of the user interface 129 where the message 218 and the interaction session ID 414 are shown. The computing device 120b and/or the operation server 140 may display the message 218 on the user interface 129, if the operation server 140 receives the message 218 from the server 112a-1 (see FIG. 2) that indicates that the delivery mechanism 114a-1 has arrived at the pickup location coordinate 106 (see FIG. 1B), similar to that described in FIG. 2.

The user 102b can acknowledge the message 218. In response, the computing device 120b and/or the operation server 140 may display the screenshot 402c. The user 102b can indicate that the process of loading the ordered objects 134a has begun by pressing the button 418.

Figure 4F:
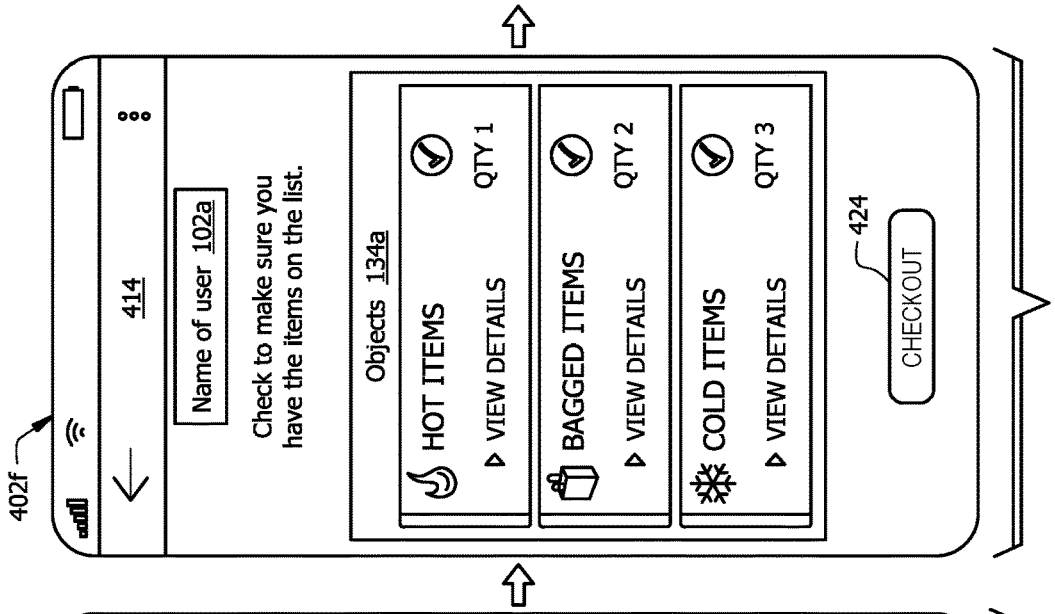
Figure 4E:
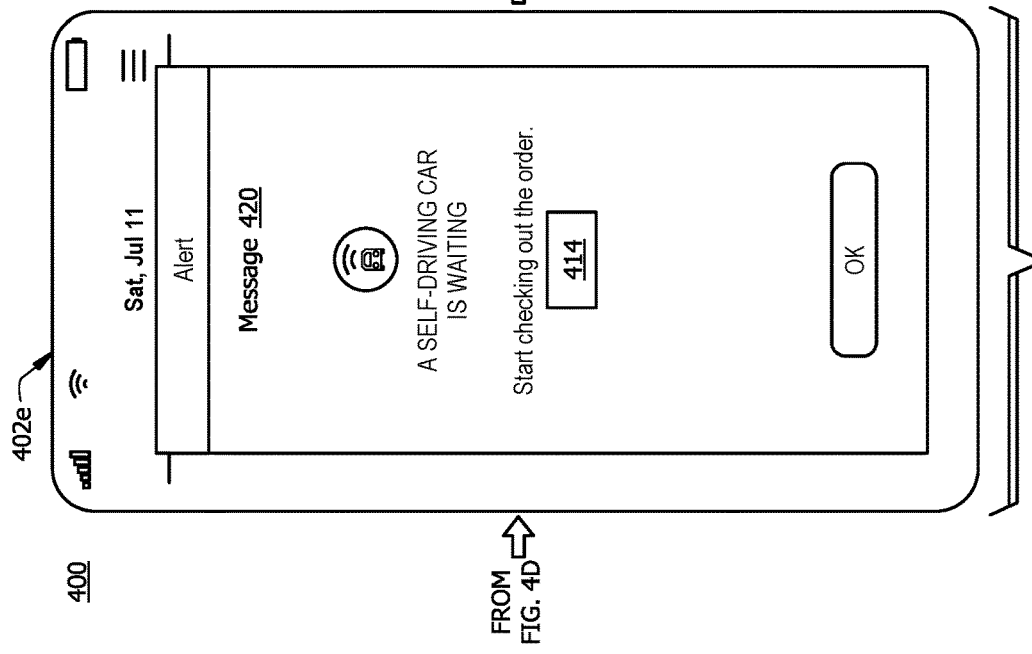

In one embodiment, if the computing device 120b and/or the operation server 140 do not receive a confirmation within a threshold time (e.g., two minutes, five minutes, etc.) that that the process of loading the ordered objects 134a into the autonomous delivery mechanism 114a-1 has begun, the computing device 120b and/or the operation server 140 may display a reminder message 420 on the user interface 129 that indicates the autonomous delivery mechanism 114a-1 is waiting at the pickup location coordinate 106, similar to that shown in an exemplary screenshot 402e illustrated in FIG. 4E. Thus, displaying the reminder message 420 is optional.

FIG. 4E illustrates the screenshot 402e of the user interface 129, where the reminder message 420 is shown. The user 102b can acknowledge the reminder message 420. In response, the computing device 120b and/or the operation server 140 may display the screenshot 402c shown in FIG. 4C. The user 102b can indicate that the process of loading the ordered objects 134a into the autonomous delivery mechanism 114a-1 has begun by pressing the button 418.

In response to initiating the process of loading the ordered objects 134a into the autonomous delivery mechanism 114a-1, the computing device 120b and/or the operation server 140 may verify the login credentials of the user 102b.

In response to verifying the login credentials of the user 102b, the computing device 120b and/or the operation server 140 may display one or more details about the ordered objects 134a on the user interface 129 so that the user 102b can confirm the one or more details, similar to that described in FIG. 4F.

FIG. 4F illustrates an exemplary screenshot 402f of the user interface 129, where one or more details about the ordered objects 134a are shown, such as the name of the user 102a, the interaction session ID 414, and the content of the memory resource 136. The user 102b can confirm the details by pressing the confirmation button 424. In response, the computing device 120b and/or the operation server 140 may present the instructions 425 on the user interface 129 that instructs the user 102b to load the ordered objects 134a into the autonomous delivery mechanism 114a-1, similar to that described in FIG. 4G.

FIG. 4G illustrates an exemplary screenshot 402g of the user interface 129, where the instructions 425, the interaction session ID 414, the name of the user 102a, and the delivery mechanism metadata 162 are shown. The user 102b can confirm that the ordered objects 134a are loaded into the autonomous delivery mechanism 114a-1 by pressing the button 426.

Example Method for Selecting Delivery Mechanisms

FIG. 5 illustrates an example flowchart of a method 500 for selecting delivery mechanisms 114. Modifications, additions, or omissions may be made to method 500. Method 500 may include more, fewer, or other steps. For example, steps may be performed in parallel or in any suitable order. While at times discussed as the system 100, operation server 140, processor 142, processing engine 144, or components of any of thereof performing steps, any suitable system or components of the system may perform one or more steps of the method 500. For example, one or more steps of method 500 may be implemented, at least in part, in the form of software instructions 150 of FIG. 1A, stored on non-transitory, tangible, machine-readable media (e.g., memory 148 of FIG. 1A) that when run by one or more processors (e.g., processor 142 of FIG. 1A) may cause the one or more processors to perform steps 502-516.

Method 500 begins at step 502 where the operation server 140 sends a request message 204 to a plurality of servers 112 associated with a plurality of delivery mechanism categories 114 to provide delivery metadata 116, where the plurality of delivery mechanism categories 114 comprises one or more autonomous delivery mechanisms 114a and one or more non-autonomous delivery mechanisms 114b, similar to that described in FIG. 2.

At step 504, the operation server 140 determines whether a threshold time period 174 has passed since sending the request message 204. The threshold time period 174 may be two minutes, five minutes, etc. If it is determined that the threshold time period 174 has passed since sending the request message 204, method 500 proceeds to step 506. Otherwise, method 500 proceeds to step 508.

At step 506, the operation server 140 sends a second request message 204 to the plurality of servers 112 to provide updated delivery metadata 116.

At step 508, the operation server 140 receives, from the plurality of servers 112, a first set of delivery metadata 116a associated with the one or more of autonomous delivery mechanisms 114a and a second set of delivery metadata 116b associated with the one or more of non-autonomous delivery mechanisms 114b, similar to that described in FIG. 2.

At step 510, the operation server 140 identifies a particular autonomous delivery mechanism 114a from among the one or more autonomous delivery mechanisms 114a based on the first set of delivery metadata 116a. In this process, the operation server 140 (via the processing engine 144) may use one or both of the set of delivery times 117a and the set of delivery quotes 118a associated with the one or more autonomous delivery mechanisms 114a, similar to that described in FIGS. 1A-1B and 2.

At step 512, the operation server 140 identifies a particular non-autonomous delivery mechanism 114b from among the one or more non-autonomous delivery mechanisms 114b based on the second set of delivery metadata 116b. In this process, the operation server 140 (via the processing engine 144) may use one or both of the set of delivery times 117b and the set of delivery quotes 118b associated with the one or more non-autonomous delivery mechanisms 114b, similar to that described in FIGS. 1A-1B and 2.

At step 514, the operation server 140 communicates to the user device 120a (i.e., computing device 120a) the identified particular autonomous delivery mechanism 114a.

At step 516, the operation server 140 communicates to the user device 120a the identified particular non-autonomous delivery mechanism 114b.

In this manner, the operation server 140 presents a selection 312 of the identified particular autonomous delivery mechanism 114a-1 and the identified particular non-autonomous delivery mechanism 114b-1 on the delivery user interface 132.

In one embodiment, the operation server 140 (e.g., via the processing engine 144) is configured to determine filtering conditions 172 (see FIG. 1A). The filtering conditions 172 may be associated with one or more of the content of the memory resource 136, the contact-less delivery option 308, delivery user interface 132, driver note 306, and the delivery location coordinate 108.

In one embodiment, before step 502, the operation server 140 (e.g., via the processing engine 144) may select the plurality of delivery mechanisms 114 based on the filtering conditions 172 to determine to send the request message 204 to which servers 112 associated with the delivery mechanisms 114.

For example, the operation server 140 may exclude the autonomous delivery mechanism categories 114a from the plurality of delivery mechanisms 114 to send the request message 204 in response to determining that the content of the memory resource 136 comprises an age-restricted object 134a. In one embodiment, the operation server 140 may not exclude the autonomous delivery mechanism categories 114a from the plurality of delivery mechanisms 114 if the autonomous delivery mechanism categories 114a are deemed to be allowed to deliver age-restricted objects 134a, for example, by having gone through a registration process by road safety regulation and/or monitoring authorities to be allowed to deliver age-restricted objects 134a.

In another example, the operation server 140 may exclude the autonomous delivery mechanism categories 114a from the plurality of delivery mechanisms 114 to send the request message 204 in response to determining that the contact-less delivery option 308 is selected on the delivery user interface 132. In one embodiment, the operation server 140 may not exclude the autonomous delivery mechanism categories 114a from the plurality of delivery mechanisms 114 as it is assumed that the user selection of autonomous delivery mechanism 114a-1 meets their desired contact-less preference; as their retrieval of ordered objects 134a from the autonomous delivery mechanism 114a-2 will not expose them to human contact or interaction, and they understand and accept that this combined contact-less-and-autonomous delivery-mechanism preference will require them to retrieve their ordered objects 134a from the autonomous delivery mechanism's drop-off location 108.

In another example, the operation server 140 may determine a type of the delivery user interface 132. For example, the operation server 140 may determine whether the type of the delivery user interface 132 is a web application or a mobile application. The operation server 140 may determine one or more delivery mechanism categories 114 that are not offered on the identified type of delivery user interface 132. In response, the operation server 140 may exclude the one or more determined delivery mechanism categories 114 from the plurality of delivery mechanism categories 114 to send the request message 204. For example, assuming that the autonomous delivery mechanism category 114a is not offered on the delivery user interface 132 that comprises a web application, the autonomous delivery mechanism category 114a is excluded from the plurality of delivery mechanism categories 114 to send the request message 204.

In another example, the operation server 140 may exclude autonomous delivery mechanisms 114b from the plurality of delivery mechanisms 114 to send the request message 204 if it is determined that the user 102a has added a driver note 306 (see FIG. 3A) on the delivery user interface 132. The user 102a may add a driver note 306 on the delivery user interface 132 to leave a message, such as delivery instructions for a driver of the delivery mechanism 114. In one embodiment, the operation server 140 may not exclude autonomous delivery mechanism categories 114a from the plurality of delivery mechanisms 114, in circumstances where the user 102a has added a driver note 306 (see FIG. 3A) on the delivery user interface 132, if a natural language process (NLP) assessment of the driver note 306 assesses that the specific delivery details/preferences requested by the user 102a are achievable within the autonomous delivery mechanism's capabilities.

In another example, the operation server 140 may exclude one or more particular delivery mechanisms 114 from the plurality of delivery mechanism categories 114 (to send the request message 204), if it is determined that the one or more particular delivery mechanisms 114 do not offer to deliver to a particular delivery location coordinate 108. For example, assume that the delivery location coordinate 108 is located in an area that is not within a delivery coverage of a particular delivery mechanism 114. In such cases, the operation server 140 excludes the particular delivery mechanism 114 from the plurality of delivery mechanism categories 114 (to send the request message 204). Alternatively or in addition, if the one or more particular delivery mechanisms 114 do not offer to deliver to a particular delivery location coordinate 108, the operation server 140 may receive a message from the one or more servers 112 associated with the one or more particular delivery mechanisms 114 that indicates they do not provide delivery to the particular delivery location coordinate 108. In response, the operation server 140 excludes the one or more particular delivery mechanisms 114 to send the request message 204.

In one embodiment, the operation server 140 may be configured to determine whether a threshold time period 174 (e.g., two minutes, five minutes, etc.) has passed after receiving the delivery metadata 116. If the operation server 140 determines that the threshold time period 174 has passed, and the operation associated with the memory resource 136 (e.g., the order 170) is not concluded, the operation server 140 sends a second request message 204 to the plurality of servers 112 to provide updated delivery metadata 116.

Example Method for Presenting Status Updates of the Selected Delivery Mechanism

FIG. 6 illustrates an example flowchart of a method 600 for presenting status updates 160 associated with the selected delivery mechanism 114. Modifications, additions, or omissions may be made to method 600. Method 600 may include more, fewer, or other steps. For example, steps may be performed in parallel or in any suitable order. While at times discussed as the system 100, operation server 140, processor 142, processing engine 144, computing device 120a, processor 122a, or components of any of thereof performing steps, any suitable system or components of the system may perform one or more steps of the method 600. For example, one or more steps of method 600 may be implemented, at least in part, in the form of software instructions 150 and/or software instructions 128 of FIG. 1A, stored on non-transitory, tangible, machine-readable media (e.g., memory 148 and/or memory 126a of FIG. 1A) that when run by one or more processors (e.g., processor 142 and/or processor 122a of FIG. 1A) may cause the one or more processors to perform steps 602-614. The corresponding description below describes steps of the method 600 being performed by the operation server 140. However, in some embodiments, one or more steps of the method 600 may be performed by the computing device 120a.

Method 600 begins at step 602 where the operation server 140 presents, on the delivery user interface 132, a plurality of objects 134 selectable to order. For example, the operation server 140 and/or the computing device 120a may present the plurality of objects 134 on the delivery user interface 132 when the delivery user interface 132 is accessed (e.g., by the user 102a) and the interaction session 152 is initiated, similar to that described in FIG. 2.

At step 604, the operation server 140 updates the content of the memory resource 136 as one or more objects 134 are added to the memory resource 136.

At step 606, the operation server 140 determines whether the content of the memory resource 136 is finalized, similar to that described in FIGS. 2 and 3A. If it is determined that the content of the memory resource 136 is finalized, method 600 proceeds to step 608. Otherwise, method 600 returns to step 604.

At step 608, the operation server 140 presents, on the delivery user interface 132, a selection 312 of delivery mechanisms 114 comprising a particular autonomous delivery mechanism 114a and a particular autonomous delivery mechanism 114b. The process of determining the selection 312 of the delivery mechanisms 114 is described in FIGS. 1A-1B, 2, and 5. The selection 312 may include delivery mechanisms 114 depending on their availability and whether they can fulfill the filtering conditions 172. The selection 312 may only include a particular autonomous delivery mechanism 114a if no non-autonomous delivery mechanisms 114b is available and/or passed the filtering conditions 172. The selection 312 may only include a particular non-autonomous delivery mechanism 114b if no autonomous delivery mechanisms 114a is available and/or passed the filtering conditions 172. The selection 312 may include the particular autonomous delivery mechanism 114a and the particular autonomous delivery mechanism 114b if at least one autonomous delivery mechanism 114a is available and passed the filtering conditions 172 and if at least one non-autonomous delivery mechanism 114b is available and passed the filtering conditions 172.

At step 610, the operation server 140 determines that a delivery mechanism 114 is selected from the selection 312 of delivery mechanisms 114. For example, the operation server 140 and/or the computing device 120a may determine that a delivery mechanism 114 is selected when the select button 314 is pressed, similar to that described in FIGS. 2 and 3B. In one embodiment, step 610 may further include determining that the operation 176 associated with the set of objects 134a is concluded, similar to that described in FIGS. 2 and 3C.

At step 612, the operation server 140 receives one or more status updates 160 associated with the selected delivery mechanism 114.

In this process, the operation server 140 receives event-triggered metadata 158 from the server 112 associated with the selected delivery mechanism 114, and forwards the event-triggered metadata 158 to the computing device 120a. The event-triggered metadata 158 may include status updates 160a to 160e associated with the ordered objects 134a and/or the selected delivery mechanism 114. The examples of status updates 160a to 160e are described in FIGS. 2 and 3D-3I.

At step 614, the operation server 140 presents the one or more status updates 160 on the delivery user interface 132, similar to that described in FIGS. 2 and 3D-3I.

Example Method for Presenting a Set of Instructions for Preparing the Content of the Memory Resource FIG. 7 illustrates an example flowchart of a method 700 for presenting the set of instructions 154 for preparing the content of the memory resource 136. Modifications, additions, or omissions may be made to method 700. Method 700 may include more, fewer, or other steps. For example, steps may be performed in parallel or in any suitable order. While at times discussed as the system 100, operation server 140, processor 142, processing engine 144, computing device 120b, processor 122b, or components of any of thereof performing steps, any suitable system or components of the system may perform one or more steps of the method 700. For example, one or more steps of method 700 may be implemented, at least in part, in the form of software instructions 150 and/or software instructions 156 of FIG. 1A, stored on non-transitory, tangible, machine-readable media (e.g., memory 148 and/or memory 126b of FIG. 1A) that when run by one or more processors (e.g., processor 142 and/or processor 122b of FIG. 1A) may cause the one or more processors to perform steps 702-716. The corresponding description below describes steps of the method 700 being performed by the operation server 140. However, in some embodiments, one or more steps of the method 700 may be performed by the computing device 120b.

Method 700 begins at step 702 where the operation server 140 presents, on the user interface 129, a first message 212 that indicates the operation 176 associated with the set of objects 134a is concluded, similar to that described in FIGS. 2 and 4A.

At step 704, the operation server 140 presents, on the user interface 129, a plurality of objects 134a. The plurality of objects may 134a may be associated with the memory resource 136, similar to that described in FIGS. 2 and 4A.

At step 706, the operation server 140 presents, on the user interface 129, the set of instructions 154 to prepare the plurality of objects 134a. The set of instructions 154 may indicate to prepare the plurality of objects 134a in a particular sequence, similar to that described in FIGS. 2 and 4A. For example, the set of instructions 154 may include instructions that indicate to prepare the above-ambient temperature objects 134a first, the ambient temperature objects 134a second, and the below-ambient temperature objects 134a third.

At step 708, the operation server 140 receives a second message 214 that indicates the plurality of objects 134a is ready for pickup by a delivery mechanism 114, similar to that described in FIGS. 2 and 4B-4C.

At step 710, the operation server 140 presents, on the user interface 129, the alert message 218 that indicates the delivery mechanism 114 has reached a pickup location coordinate 106. For example, the operation server 140 may receive the message 218 from the server 112a-1 associated with the selected autonomous delivery mechanism 114a-1, and forward the message 218 to the computing device 120b, similar to that described in FIGS. 2 and 4D.

At step 712, the operation server 140 determines whether delivery mechanism 114 is an autonomous delivery mechanism 114a, e.g., the autonomous delivery mechanism 114a-1. For example, the operation server 140 may determine whether the delivery mechanism 114 is an autonomous delivery mechanism 114a by determining which delivery mechanism 114 was selected from the selection 312 of delivery mechanisms 114, similar to that described in FIGS. 2 and 2B. In another example, the operation server 140 and/or the computing device 120b may determine whether the delivery mechanism 114 is an autonomous delivery mechanism 114a based on the message 218. If it is determined that the delivery mechanism 114 is an autonomous delivery mechanism 114a, method 700 proceeds to step 714. Otherwise, method 700 proceeds to step 716.

At step 714, the operation server 140 presents, on the user interface 129, a pin number 164 that unlocks the autonomous delivery mechanism 114a. In one embodiment, the operation server 140 and/or the computing device 120b may present delivery mechanism metadata 162 on the user interface 129, similar to that described in FIGS. 2 and 4G.

At step 716, the operation server 140 presents, on the user interface 129, an identifier 167 associated with a non-autonomous delivery mechanism 114b. For example, the identifier 167 associated with the non-autonomous delivery mechanism 114b may include a plate number, a unique ID number, and the like.

Example Method for Assigning a Store to a Memory Resource

FIG. 8 illustrates an example flowchart of a method 800 for assigning a physical space 111 to a memory resource 136. Modifications, additions, or omissions may be made to method 800. Method 800 may include more, fewer, or other steps. For example, steps may be performed in parallel or in any suitable order. While at times discussed as the system 100, operation server 140, processor 142, processing engine 144, or components of any of thereof performing steps, any suitable system or components of the system may perform one or more steps of the method 800. For example, one or more steps of method 800 may be implemented, at least in part, in the form of software instructions 150 of FIG. 1A, stored on non-transitory, tangible, machine-readable media (e.g., memory 148 of FIG. 1A) that when run by one or more processors (e.g., processor 142 of FIG. 1A) may cause the one or more processors to perform steps 802-818.

Method 800 begins at step 802 where the operation server 140 receives, from the user device 120*a*, the content of a memory resource 136. For example, the operation server 140 receives the content of the memory resource 136 when the operation server 140 receives the message 208 from the user device 120*a*, similar to that described in FIGS. 2 and 3A-3C.

In one embodiment, before step 802, the operation server 140 may present a plurality of objects 134 on the delivery user interface 132 such that availability of objects 134 in resource data 182 associated with multiple physical spaces 111 are presented on the delivery user interface 132. Thus, the user 102*a* can select one or more objects 134 that may be available in different physical spaces 111.

At step 804, the operation server 140 compares the content of the memory resource 136 with a first resource data 182*a* associated with a first physical space 111*a*, and with a second resource data 182*b* associated with a second physical space 111*b*. In one embodiment, before step 804, the operation server 140 may select the first and second physical spaces 111*a* and 111*b* from among a plurality of physical spaces 111 because the location coordinates 106 associated with the first and second physical spaces 111*a* and 111*b* are determined to be within a threshold distance 186 from the delivery location coordinate 108.

At step 806, the operation server 140 determines whether the first resource data 182*a* includes more than the first threshold percentage 184*a* of objects 134*a*. In other words, the operation server 140 determines whether the first physical space 111*a* can fulfill more than a first threshold percentage 184*a* of objects 134*a* in the memory resource 136 based on the first resource data 182*a* (or based on the comparison between the content of the memory resource 136 and the first resource data 182*a*). The first threshold percentage 184*a* may be, for example, 60%, 70%, etc. For example, the operation server 140 may determine whether the first resource data 182*a* includes most of the content of the memory resource 136. If it is determined that the resource data 182*a* includes more than the first threshold percentage 184*a* of objects 134*a* in the memory resource 136, method 800 proceeds to step 808. Otherwise, method 800 proceeds to step 810.

At step 808, the operation server 140 assigns the first physical space 111*a* to the memory resource 136 for concluding an operation 176 associated with the memory resource 136. For example, the operation server 140 may conclude the operation 176 associated with the memory resource 136, similar to that described in FIGS. 2 and 3C. In response, the operation server 140 may include the pickup location coordinate 106 (which in this example is the location coordinate associated with the first physical space 111*a*) in the message 216 (see FIG. 2). Thus, the operation server 140 indicates to the server 112 to pick up the objects 134*a* from the pickup location coordinate 106.

At step 810, the operation server 140 determines whether second resource data 182*b* includes more that the first threshold percentage 184*a* of objects 134*a*. In other words, the operation server 140 determines whether the second physical space 111*b* can fulfill more than the first threshold percentage 184*a* of objects 134*a* in the memory resource 136 based on the second resource data 182*b* (or based on the comparison between the content of the memory resource 136 and the second resource data 182*b*). For example, the operation server 140 may determine whether the second resource data 182*b* includes most of the content of the memory resource 136. If it is determined that the second resource data 182*b* includes more than the first threshold percentage 184*a* of objects 134*a* in the memory resource 136, method 800 proceeds to step 812. Otherwise, method 800 proceeds to step 814. In response, the operation server 140 may include the pickup location coordinate 106 (which in this example is the location coordinate associated with the second physical space 111*b*) in the message 216 (see FIG. 2).

At step 812, the operation server 140 assigns the second physical space 111*b* to the memory resource 136 for concluding the operation 176 associated with the memory resource 136, similar to that described in FIGS. 2 and 3C.

At step 814, the operation server 140 determines whether the first and second resource data 182*a* and 182*b* include more that the second threshold percentage 184*b* of objects 134*a*. In other words, the operation server 140 determines whether the first and second physical spaces 111*a-b* can fulfill more than a second threshold percentage 184*b* of objects 134*a* in the memory resource 136. The second threshold percentage 184*b* may be, for example, 60%, 70%, etc. The second threshold percentage 184*b* may be the same as or different from the first threshold percentage 184*a*. If it is determined that the first and second physical resource data 182*a* and 182*b* include more than the second threshold percentage 184*b* of objects 134*a* in the memory resource 136, method 800 proceeds to step 816. Otherwise, method 800 proceeds to step 818.

At step 816, the operation server 140 assigns the first and second physical spaces 111*a-b* to the memory resource 136 for concluding the operation 176 associated with the memory resource 136, similar to that described in FIGS. 2 and 3C. In response, the operation server 140 may include the pickup location coordinates 106 (which in this example are a first location coordinate 106 associated with the first physical space 111*a* and a second location coordinate 106 associated with the second physical space 111*b*) in the message 216 (see FIG. 2).

Further, the operation server 140 may indicate to the server 112 (in the message 216 (see FIG. 2)) and the delivery mechanism 114 to pick up at least a first set of objects 134*a* from among the content of the memory resource 136 from the first physical space 111*a*, and at least a second set of objects 134*a* from among the content of the memory resource 136 from the second physical space 111*b*. For example, the operation server 140 may indicate to the server 112 and the delivery mechanism 114 to have a first stop at the first pickup location coordinate 106 associated with the first physical space 111*a*, a second stop at the second pickup location coordinate 106 associated with the second physical space 111*b*, and a third stop at the delivery location coordinate 108.

In one embodiment, the operation server 140 is configured to determine that the first physical space 111*a* is located within a threshold distance 186 from the delivery location coordinate 108, and that the first physical space 111*a* can fulfill more than the first threshold percentage 184*a* of objects 134*a* in the memory resource 136 (i.e., the first resource data 182*a* includes more that the first threshold percentage 184a of objects 134a). In response to determining that the first physical space 111a is located within a threshold distance 186 from the delivery location coordinate 108, and that the first physical space 111a can fulfill more than the first threshold percentage 184a of objects 134a in the memory resource 136, the operation server 140 assigns or associates the first physical space 111a to the memory resource 136 for concluding the operation 176 associated with the memory resource 136.

At step 818, the operation server 140 identifies two or more resource data 182 that include more than the second threshold percentage 184b of objects 134a. In other words, the operation server 140 identifies two or more physical spaces 111 that can fulfill more than the second threshold percentage 184b of objects 134a from among the set of objects 134b. For example, the operation server 140 may compare resource data 182 associated with two or more physical spaces 111 (including or instead of the first and second physical spaces 111), and determine which combination of resource data 182 includes more than the second threshold percentage 184b of objects 134a from among the set of objects 134b.

At step 820, the operation server 140 assigns two or more physical spaces associated with the identified two or more resource data 182 to the set of objects 134a for conducting the operation 176 associated with the rest of objects 134a.

In one embodiment, the operation server 140 is configured to determine whether there is a single physical space 111 from among the plurality of stores 111 that can fulfill the content of the memory resource 136. In other words, the operation server 140 is configured to determine whether there is a single resource data 182 that includes the objects 134a (i.e., the content of the memory resource 136).

In response to determining that there is a single physical space 111 that can fulfill the content of the memory resource 136, the operation server 140 may assign that single physical space 111 to the memory resource 136 for concluding the operation 176 associated with the memory resource 136. In response to determining that there is no single physical space 111 that can fulfill the content of the memory resource 136, the operation server 140 identifies two or more physical spaces 111 from among the plurality of physical spaces 111 that can fulfill the content of the memory resource 136.

In other words, the operation server 140 is configured to determine whether there is a single resource data 182 that includes the objects 134a (i.e., the content of the memory resource 136). In response to determining that there is a single resource data 182 that includes the objects 134a, the operation server 140 may assign a physical space 111 associated with the identified single resource data 182 to the memory resource 136 for conducting the operation 176. In response to determining that there is not single resource data 182 that includes the objects 134a, the operation server 140 identifies two or more resource data 182 that in the aggregate include the objects 134a. In response, the operation server 140 assigns two or more physical spaces 111 associated with the identified two or more resource data 182 to the memory resource 136 for concluding the operation 176.

The operation server 140, then, may indicate the identified two or more physical spaces 111 to the computing device 120b, such that the identified two or more physical spaces 111 are displayed on the delivery user interface 132. The operation server 140 may indicate to the server 112 associated with the selected delivery mechanism 114 (see description of the processing the selecting 312 the selected delivery mechanism 114 in FIGS. 1A-1B, 2, and 3B) to pick up the content of the memory resource 136 from two or more pickup location coordinates 106 associated with the identified two or more physical spaces 111 and to deliver to a delivery location coordinate 108.

In this example, the operation server 140 may include the two or more pickup location coordinates 106 and the delivery location coordinate 108 in the request message 204 (see FIG. 2) to provide delivery metadata 116. Thus, the delivery metadata 116 may include a delivery time 117 and a delivery quote 118 for each of the two or more physical spaces 111.

In one embodiment, the operation server 140 may include the delivery time 117 and the delivery quote 118 for each of the two or more physical spaces 111 in the message 206, such that they are displayed on the delivery user interface 132.

In one embodiment, the operation server 140 may determine that the first physical space 111a can fulfill which objects 134a from the memory resource 136, and that the second physical space 111b can fulfill which objects 134a from the memory resource 136. The operation server 140 may indicate this information to the computing device 120a such that a first set of objects 134a that the first physical space 111a can fulfill, and a second set of objects 134 that the second physical space 111b can fulfill are presented on the delivery user interface 132.

Example Method for Integrating an Adjust Drop-Off Location into a Delivery User Interface FIG. 9 illustrates an example flowchart of a method 900 for integrating an adjust drop-off location element 322 into a delivery user interface 132. Modifications, additions, or omissions may be made to method 900. Method 900 may include more, fewer, or other steps. For example, steps may be performed in parallel or in any suitable order. While at times discussed as the system 100, operation server 140, processor 142, processing engine 144, or components of any of thereof performing steps, any suitable system or components of the system may perform one or more steps of the method 900. For example, one or more steps of method 900 may be implemented, at least in part, in the form of software instructions 150 of FIG. 1A, stored on non-transitory, tangible, machine-readable media (e.g., memory 148 of FIG. 1A) that when run by one or more processors (e.g., processor 142 of FIG. 1A) may cause the one or more processors to perform steps 902-914.

Method 900 begins at step 902 where the operation server 140 sends a drop-off location coordinate 108 to a server 112 associated with a delivery mechanism 114. For example, the operation server 140 may include the drop-off location coordinate 108 in the request message 204 to be sent the server 112, similar to that described in FIG. 2.

At step 904, the operation server 140 receives, from the server 112, a hyperlink 188 that upon access, the drop-off location 108 is displayed on a virtual map 324. For example, the operation server 140 may receive the hyperlink 188 in any of the messages and/or communications received from the server 112a-1 described in FIG. 2. For example, the operation server 140 may receive the hyperlink 188 along with the event-triggered metadata 158b, similar to that described in FIG. 2.

At step 906, the operation server 140 links the hyperlink 188 to the adjust drop-off element 322, such that when the adjust drop-off element 322 is accessed, the virtual map 324 is displayed within a delivery user interface 132, similar to that described in FIG. 3G.

At step 908, the operations server 140 determines whether the adjust drop-off element 322 is accessed, and whether the drop-off location coordinate 108 is adjusted on the virtual map 324. For example, the operation server 140 may determine whether the user 102a has pressed on the adjust drop-off element 322 and adjusted the drop-off location coordinate 108 on the virtual map 324, similar to that described in FIG. 3G. If it is determined that the adjust drop-off element 322 is accessed, and that the drop-off location coordinate 108 is adjusted on the virtual map 324, method 900 proceeds to step 912. Otherwise, method 900 proceeds to step 914.

At step 912, the operation server 140 adjusts the drop-off location coordinate 108. In response, the operation server 140 forwards the updated or adjusted drop-off location coordinate 108 to the server 112 (associated with the selected delivery mechanism 114).

At step 914, the operation server 140 does not adjust the drop-off location coordinate 108.

In one embodiment, the operation server 140 may send the request message 216 to the server 112 (associated with the selected delivery mechanism 114) to transmit the set of event-triggered metadata 158b to a particular (Uniform Resource Locator) URL address 190 associated with the operation server 140. For example, the URL address 190 may include an Application Programming Interface (API) endpoint associated with the operation server 140.

The operation server 140 may link the particular URL address 190 to the status update element 326, such that upon receiving each of the set of status updates 160, the status update element 326 displays and/or highlights each of the status updates 160, similar to that described in FIGS. 3D to 3I.

The operation server 140 integrates the status update element 326 into the delivery user interface 132 such that the status update element 326 is accessible from within the delivery user interface 132. Thus, when the operation server 140 receives each of the event-triggered metadata 158a, b, the operation server 140 triggers the status update element 326 to display each of the status updates 160a-e, similar to that described in FIGS. 3D to 3I.

In one embodiment, the request message 216 may further indicate to provide tracking data 192 associated with the selected delivery mechanism 114. The operation server 140 receives the tracking data 192 from the server 112, e.g., continuously, periodically (e.g., every second, every minute, etc.), or on-demand. The operation server 140 determines a set of location coordinates 328 associated with the selected delivery mechanism 114 based on the tracking data 192. In response, the operation server 140 sends the determined location coordinate 328 to the computing device 120a, such that the location coordinate 328 associated with the selected delivery mechanism 114 is displayed on the map 318, similar to that described in FIGS. 3E to 3I.

Example Method for Generating a Set of Instructions to Prepare a Set of Objects in a Particular Sequence FIG. 10 illustrates an example flowchart of a method 1000 for generating a set of instructions 154 to prepare a set of objects 134a in a particular sequence. Modifications, additions, or omissions may be made to method 1000. Method 1000 may include more, fewer, or other steps. For example, steps may be performed in parallel or in any suitable order. While at times discussed as the system 100, operation server 140, processor 142, processing engine 144, or components of any of thereof performing steps, any suitable system or components of the system may perform one or more steps of the method 1000. For example, one or more steps of method 1000 may be implemented, at least in part, in the form of software instructions 150 of FIG. 1A, stored on non-transitory, tangible, machine-readable media (e.g., memory 148 of FIG. 1A) that when run by one or more processors (e.g., processor 142 of FIG. 1A) may cause the one or more processors to perform steps 1002-10120.

Method 1000 begins at step 1002 where the operation server 140 receives the content of a memory resource 136 that comprises a set of objects 134a. For example, the operation server 140 receives the content of the memory resource 136 from the computing device 120a, similar to that described in FIG. 2.

At step 1004, the operation server 140 generates a set of instructions 154 to prepare the set of objects 134a in a particular sequence, similar to that described in FIG. 2.

For example, the operation server 140 may determine whether the set of objects 134a includes an above-ambient temperature object 134a. If it is determined that the set of objects 134a includes the above-ambient temperature objects 134a, the operation server 140 generates a first instruction 154 that indicates to prepare the above temperature object 134a before other objects 134a.

In another example, the operation server 140 may determine whether the set of objects 134a includes an ambient temperature objects 134a. If it is determined that the set of objects 134a includes the ambient temperature object 134a, the operation server 140 generates a second instruction 154 that indicates to prepare the ambient temperature objects 134a after the above temperature objects 134a.

In another example, the operation server 140 may determine whether the set of objects 134a includes a below-ambient object 134a. If it is determined that the set of objects 134a includes the below-ambient temperature object 134a, the operation server 140 generates a third instruction 154 that indicates to prepare the below-ambient object 134a after the ambient temperature objects 134a.

At step 1006, the operation server 140 sends, to the user device 120b, a first message 212 that comprises the content of the memory resource 136 and the set of instructions 154, similar to that described in FIGS. 2 and 4A.

At step 1008, the operation server 140 receives, from the user device 120b, a second message 214 that indicates the set of objects 134 are being prepared, similar to that described in FIGS. 2 and 4A-4B.

At step 1010, the operation server 140 sends, to a server 112 associated with a delivery mechanism 114, a third message 216 that indicates to pick up the set of objects 134a from a pickup location coordinate 106 and deliver to a delivery location coordinate 108. For example, the operation server 140 may send the third message 216 to the server 112a-1 associated with the selected autonomous delivery mechanism 114a-1, similar to that described in FIG. 2.

At step 1012, the operation server 140 receives, from the server 112, an alert message 218 that indicates the delivery mechanism 114 has reached the pickup location coordinate 106. For example, the operation server 140 may receive the alert message 218 along with the event-triggered metadata 158b from the server 112, similar to that described in FIG. 2.

At step 1014, the operation server 140 forwards the alert message 218 to the user device 120b, similar to that described in FIGS. 2 and 4D.

At step 1016, the operation server 140 determines whether the set of objects 134a is loaded into the delivery mechanism 114 within the threshold time period 174. For example, the operation server 140 may determine whether the set of objects 134a is loaded into the delivery mechanism 114, if the operation server 140 receives the message 220 from the user device 120b that indicates the set of objects 134a is loaded into the delivery mechanism 114, similar to that described in FIGS. 2 and 4D. For example, the operation server 140 may determine whether the message 220 is received within a threshold time period 174 (e.g., two minutes, five minutes, etc.). If the operation server 140 determines that the message 220 is received within the threshold time period 174, method 1000 proceeds to step 1020. Otherwise, method 1000 proceeds to step 1018. In other words, if the operation server 140 determines that the set of objects 134a is loaded into the delivery mechanism 114 (within the threshold time period 174), method 1000 may terminate. Otherwise, method 1000 proceeds to step 1018.

At step 1018, the operation server 140 sends, to the user device 120b, a reminder message 420 that indicates the delivery mechanism 114 is waiting at the pickup location coordinate 106, similar to that described in FIGS. 2 and 4E.

At step 1020, the operation server 140 updates the status of the set of objects 134a to indicate that the set of objects 134a is loaded into the delivery mechanism 114. For example, the operation server 140 may trigger the status update 160 associated with the set of objects 134a to be indicate that the set of objects 134a is loaded into the delivery mechanism 114, similar to that described in FIGS. 2 and 3G.

In one embodiment, the operation server 140 may send multiple reminder messages 420 in the same or different time intervals (e.g., two minutes, five minutes, etc.), until the operation server 140 receives the message 220.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other objects shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
a memory, configured to store a set of objects associated with a memory resource;
a first processor, operably coupled with the memory, and configured to:
generate a set of instructions to prepare the set of objects in a particular sequence;
send, to a user device, a first message that comprises at least one of the set of objects and the set of instructions;
receive, from the user device, a second message that indicates the set of objects is being prepared;
receive a set of delivery metadata, wherein each delivery metadata comprises a respective delivery time that indicates an amount of time that a respective delivery vehicle would take to travel to a first physical space and deliver at least a first threshold percentage of objects to a delivery location;
determine that a first delivery metadata comprises a shortest delivery time from among the set of delivery metadata, wherein the first delivery metadata is associated with a first delivery vehicle;
select the first delivery vehicle from among a set of delivery vehicles based at least in part upon determining that the first delivery metadata comprises the shortest delivery time from among the rest of the set of delivery metadata;
in response to selecting the first delivery vehicle, indicate to the first delivery vehicle to pick up the set of objects from a pickup location coordinate and deliver to a delivery location, wherein in response to the indication, the first delivery vehicle is moved toward the pickup location coordinate;
receive, from a server associated with the first delivery vehicle, an alert message that indicates the first delivery vehicle has reached the pickup location coordinate;
forward the alert message to the user device, such that the alert message is presented on a user interface;
determine that the set of objects is delivered to the delivery location coordinate; and
perform an operation associated with the set of objects being delivered to the delivery location coordinate.

2. The system of claim 1, wherein generating the set of instructions to prepare the set of objects in the particular sequence comprises:
determining whether the set of objects comprises an above-ambient temperature object;
in response to determining that the set of objects comprises the above-ambient temperature object, generating a first instruction from the set of instructions that indicates to prepare the above-ambient temperature object before other objects in the set of objects;
determining whether the set of objects comprises an ambient temperature object;
in response to determining that the set of objects comprises the ambient temperature object, generating a second instruction from the set of instructions that indicates to prepare the ambient temperature object after the above-ambient temperature object;
determining whether the set of objects comprises a below-ambient temperature object; and
in response to determining that the set of objects comprises the below-ambient temperature object, generating a third instruction from the set of instructions that indicates to prepare the below-ambient temperature object after the ambient temperature object.

3. The system of claim 2, wherein the set of instructions comprises first scheduling instructions to prepare the set of objects, such that a first timestamp that indicates the above-ambient temperature object is ready for preparation is synchronized with a second timestamp that indicates when the first delivery vehicle will reach the pickup location coordinate.

4. The system of claim 2, wherein the set of instructions comprises second scheduling instructions to prepare the set of objects, such that a third timestamp that indicates the above-ambient temperature object is ready for pickup is synchronized with a fourth timestamp that indicates when the first delivery vehicle has reached the pickup location coordinate.

5. The system of claim 2, wherein:
the memory is further configured to save map data associated with a physical space, wherein the map data comprises a set of location coordinates of the set of objects within the physical space, and
the first processor is further configured to determine the set of location coordinates associated with the set of objects within the physical space based at least in part upon the map data, wherein generating the set of instructions to prepare the set of objects in the particular sequence comprises indicating a location of each object from among the set of objects within the physical space in the set of instructions based at least in part upon the map data.

6. The system of claim 1, wherein the first processor is further configured to:
receive, from the server, a fourth message that comprises at least one of a unique identifier that is used to identify the first delivery vehicle and a pin number that is used to unlock the first delivery vehicle; and
forward the fourth message to the user device, such that the fourth message is presented on the user interface.

7. The system of claim 1, wherein the first processor is further configured to:
in response to forwarding the alert message to the user device, determine whether an acknowledgment message is received within a threshold time period from the user device that indicates the set of objects is loaded in the first delivery vehicle; and
in response to determining that the acknowledgment message is not received within the threshold time period from the user device, send a reminder message that indicates the first delivery vehicle has reached the pickup location coordinate to the user device.

8. A method, comprising:
generating, by a first processor, a set of instructions to prepare a set of objects in a particular sequence, wherein the set of objects is associated with a memory resource;
sending, by the first processor to a user device, a first message that comprises at least one of the set of objects and the set of instructions;
receiving, by the first processor from the user device, a second message that indicates the set of objects is being prepared;
receiving, by the first processor, a set of delivery metadata, wherein each delivery metadata comprises a respective delivery time that indicates an amount of time that a respective delivery vehicle would take to travel to a first physical space and deliver at least a first threshold percentage of objects to a delivery location;
determining, by the first processor, that a first delivery metadata comprises a shortest delivery time from among the set of delivery metadata, wherein the first delivery metadata is associated with a first delivery vehicle;
selecting, by the first processor, the first delivery vehicle from among a set of delivery vehicles based at least in part upon determining that the first delivery metadata comprises the shortest delivery time from among the rest of the set of delivery metadata;
in response to selecting the first delivery vehicle, indicating, by the first processor, to the first delivery vehicle to pick up the set of objects from a pickup location coordinate and deliver to a delivery location coordinate;
receiving, by the first processor from a server associated with the first delivery vehicle, an alert message that indicates the first delivery vehicle has reached the pickup location coordinate;
forwarding, by the first processor, the alert message to the user device, such that the alert message is presented on a user interface;
determining, by the first processor, that the set of objects is delivered to the delivery location coordinate; and
performing, by the first processor, an operation associated with the set of objects being delivered to the delivery location coordinate.

9. The method of claim 8, wherein generating, by the first processor, the set of instructions to prepare the set of objects in the particular sequence comprises:
determining whether the set of objects comprises an above-ambient temperature object;
in response to determining that the set of objects comprises the above-ambient temperature object, generating a first instruction from the set of instructions that indicates to prepare the above-ambient temperature object before other objects in the set of objects;
determining whether the set of objects comprises an ambient temperature object;
in response to determining that the set of objects comprises the ambient temperature object, generating a second instruction from the set of instructions that indicates to prepare the ambient temperature object after the above-ambient temperature object;
determining whether the set of objects comprises a below-ambient temperature object; and
in response to determining that the set of objects comprises the below-ambient temperature object, generating a third instruction from the set of instructions that indicates to prepare the below-ambient temperature object after the ambient temperature object.

10. The method of claim 9, wherein the set of instructions comprises first scheduling instructions to prepare the set of objects, such that a first timestamp that indicates the above-ambient temperature object is ready for preparation is synchronized with a second timestamp that indicates when the first delivery vehicle will reach the pickup location coordinate.

11. The method of claim 9, wherein the set of instructions comprises second scheduling instructions to prepare the set of objects, such that a third timestamp that indicates the above-ambient temperature object is ready for pickup is synchronized with a fourth timestamp that indicates when the first delivery vehicle has reached the pickup location coordinate.

12. The method of claim 9, further comprising:
determining, by the first processor, a set of location coordinates associated with the set of objects within a physical space based at least in part upon map data associated with the physical space, wherein:
the map data comprises the set of location coordinates of the set of objects within the physical space; and
generating, by the first processor, the set of instructions to prepare the set of objects in the particular sequence comprises indicating a location of each object from among the set of objects within the physical space in the set of instructions based at least in part upon the map data.

13. The method of claim 8, further comprising:
receiving, by the first processor from the server, a fourth message that comprises at least one of a unique identifier that is used to identify the first delivery vehicle and a pin number that is used to unlock the first delivery vehicle; and
forwarding, by the first processor, the fourth message to the user device, such that the fourth message is presented on the user interface.

14. The method of claim 8, further comprising:
in response to forwarding the alert message to the user device, determining, by the first processor, whether an acknowledgment message is received within a threshold time period from the user device that indicates the set of objects is loaded in the first delivery vehicle; and
in response to determining that the acknowledgment message is not received within the threshold time period from the user device, sending, by the first processor, a reminder message that indicates the first delivery vehicle has reached the pickup location coordinate to the user device.

15. A non-transitory computer-readable medium comprising software instructions that when executed by one or more processors cause the one or more processors to:
generate, by a first processor, a set of instructions to prepare a set of objects in a particular sequence, wherein the set of objects is associated with a memory resource;
send, by the first processor to a user device, a first message that comprises at least one of the set of objects and the set of instructions;
receive, by the first processor from the user device, a second message that indicates the set of objects is being prepared;
receive, by the first processor, a set of delivery metadata, wherein each delivery metadata comprises a respective delivery time that indicates an amount of time that a respective delivery vehicle would take to travel to a first physical space and deliver at least a first threshold percentage of objects to a delivery location;
determine, by the first processor, that a first delivery metadata comprises a shortest delivery time from among the set of delivery metadata, wherein the first delivery metadata is associated with a first delivery vehicle;
select, by the first processor, the first delivery vehicle from among a set of delivery vehicles based at least in part upon determining that the first delivery metadata comprises the shortest delivery time from among the rest of the set of delivery metadata;
in response to selecting the first delivery vehicle, indicate, by the first processor, to the first delivery vehicle, to pick up the set of objects from a pickup location coordinate and deliver to a delivery location coordinate;
receive, by the first processor from a server associated with the first delivery vehicle, an alert message that indicates the first delivery vehicle has reached the pickup location coordinate;
forward, by the first processor, the alert message to the user device, such that the alert message is presented on a user interface;
determine, by the first processor, that the set of objects is delivered to the delivery location coordinate; and
perform, by the first processor, an operation associated with the set of objects being delivered to the delivery location coordinate.

16. The non-transitory computer-readable medium of claim 15, wherein generating, by the first processor, the set of instructions to prepare the set of objects in the particular sequence comprises:
determining whether the set of objects comprises an above-ambient temperature object;
in response to determining that the set of objects comprises the above-ambient temperature object, generating a first instruction from the set of instructions that indicates to prepare the above-ambient temperature object before other objects in the set of objects;
determining whether the set of objects comprises an ambient temperature object;
in response to determining that the set of objects comprises the ambient temperature object, generating a second instruction from the set of instructions that indicates to prepare the ambient temperature object after the above-ambient temperature object;
determining whether the set of objects comprises a below-ambient temperature object; and
in response to determining that the set of objects comprises the below-ambient temperature object, generating a third instruction from the set of instructions that indicates to prepare the below-ambient temperature object after the ambient temperature object.

17. The non-transitory computer-readable medium of claim 16, wherein the set of instructions comprises first scheduling instructions to prepare the set of objects, such that a first timestamp that indicates the above-ambient temperature object is ready for preparation is synchronized with a second timestamp that indicates when the first delivery vehicle will reach the pickup location coordinate.

18. The non-transitory computer-readable medium of claim 16, wherein the set of instructions comprises second scheduling instructions to prepare the set of objects, such that a third timestamp that indicates the above-ambient temperature object is ready for pickup is synchronized with a fourth timestamp that indicates when the first delivery vehicle has reached the pickup location coordinate.

19. The non-transitory computer-readable medium of claim 16, wherein the memory resource comprises a digital cart.

20. The non-transitory computer-readable medium of claim 15, wherein the software instructions further cause the one or more processors to:
receive, by the first processor from the server, a fourth message that comprises at least one of a unique identifier that is used to identify the first delivery vehicle and a pin number that is used to unlock the first delivery vehicle; and
forward, by the first processor, the fourth message to the user device, such that the fourth message is presented on the user interface.

* * * * *